US011468911B2

(12) United States Patent
Iwamoto et al.

(10) Patent No.: US 11,468,911 B2
(45) Date of Patent: *Oct. 11, 2022

(54) MAGNETIC TAPE HAVING CHARACTERIZED MAGNETIC LAYER, MAGNETIC TAPE CARTRIDGE, AND MAGNETIC TAPE APPARATUS

(71) Applicant: FUJIFILM Corporation, Tokyo (JP)

(72) Inventors: Takahiro Iwamoto, Minami-ashigara (JP); Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/658,565

(22) Filed: Oct. 21, 2019

(65) Prior Publication Data

US 2020/0126589 A1 Apr. 23, 2020

(30) Foreign Application Priority Data

Oct. 22, 2018 (JP) .............................. JP2018-198191

(51) Int. Cl.
| | | |
|---|---|---|
| *G11B 5/708* | (2006.01) | |
| *G11B 5/71* | (2006.01) | |
| *G11B 5/706* | (2006.01) | |
| *G11B 5/702* | (2006.01) | |
| *G11B 5/735* | (2006.01) | |
| *G11B 5/78* | (2006.01) | |
| *G11B 23/04* | (2006.01) | |

(52) U.S. Cl.
CPC ............ *G11B 5/7085* (2013.01); *G11B 5/702* (2013.01); *G11B 5/706* (2013.01); *G11B 5/7021* (2013.01); *G11B 5/71* (2013.01); *G11B 5/7356* (2019.05); *G11B 5/78* (2013.01); *G11B 23/041* (2013.01)

(58) Field of Classification Search
None
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,524,108 A | 6/1985 | Kawakami |
| 4,590,119 A | 5/1986 | Kawakami et al. |
| 4,693,930 A | 9/1987 | Kuo et al. |
| 4,731,292 A | 3/1988 | Sasaki et al. |
| 4,746,569 A | 5/1988 | Takahashi et al. |
| 4,818,606 A | 4/1989 | Koyama et al. |
| 4,825,317 A | 4/1989 | Rausch |
| 4,861,674 A | 8/1989 | Inaba et al. |
| 5,006,406 A | 4/1991 | Kovacs |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,258,519 B1 | 7/2001 | Matsunaga et al. |
| 6,261,647 B1 | 7/2001 | Komatsu et al. |
| 6,268,043 B1 | 7/2001 | Koizumi et al. |
| 6,282,051 B1 | 8/2001 | Albrecht et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |

(Continued)

FOREIGN PATENT DOCUMENTS

| | | |
|---|---|---|
| CA | 2 282 171 A1 | 3/2000 |
| CN | 1630680 A | 6/2005 |

(Continued)

OTHER PUBLICATIONS

Office Action dated Sep. 27, 2019 in U.S. Appl. No. 16/361,570.
Communication dated Mar. 3, 2020 by the Japanese Patent Office in application No. 2017-123062; corresponds to U.S. Appl. No. 16/009,461.
Office Action dated Jun. 10, 2020 in U.S. Appl. No. 16/848,331.
Office Action dated Jun. 16, 2020 in U.S. Appl. No. 16/777,201.
Office Action dated Aug. 18, 2020 in U.S. Appl. No. 16/361,797.
Office Action dated Sep. 2, 2020 in U.S. Appl. No. 16/361,814.
Non-Final Office Action dated Feb. 3, 2021 in U.S. Appl. No. 16/009,461.

(Continued)

*Primary Examiner* — Kevin M Bernatz
(74) *Attorney, Agent, or Firm* — Sughrue Mion, PLLC

(57) ABSTRACT

The magnetic tape includes a non-magnetic support; a non-magnetic layer including a non-magnetic powder and a binding agent on the non-magnetic support; and a magnetic layer including a ferromagnetic powder and a binding agent on the non-magnetic layer, in which a total thickness of the non-magnetic layer and the magnetic layer is equal to or smaller than 0.60 μm, an isoelectric point of a surface zeta potential of the magnetic layer is equal to or greater than 5.5, the magnetic layer includes an oxide abrasive, and an average particle diameter of the oxide abrasive obtained from a secondary ion image obtained by irradiating the surface of the magnetic layer with a focused ion beam is 0.04 μm to 0.08 μm.

20 Claims, No Drawings

(56) References Cited

U.S. PATENT DOCUMENTS

| | | |
|---|---|---|
| 6,770,359 B2 | 8/2004 | Masaki |
| 6,791,803 B2 | 9/2004 | Saito et al. |
| 6,835,451 B2 | 12/2004 | Ejiri |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,341,798 B2 | 3/2008 | Hirai |
| 7,474,505 B2 | 1/2009 | Hirai |
| 7,511,907 B2 | 3/2009 | Dugas et al. |
| 7,515,383 B2 | 4/2009 | Saito et al. |
| 7,656,602 B2 | 2/2010 | Iben et al. |
| 7,755,863 B2 | 7/2010 | Neumann et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka .................. G11B 5/70 |
| | | 428/844 |
| 8,576,510 B2 | 11/2013 | Cherubini et al. |
| 8,609,264 B2 | 12/2013 | Mitsuoka et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,347,280 B2 | 7/2019 | Kasada et al. |
| 10,373,633 B2 | 8/2019 | Kaneko et al. |
| 10,373,639 B2 | 8/2019 | Kasada et al. |
| 10,403,314 B2 | 9/2019 | Kasada et al. |
| 10,403,319 B2 | 9/2019 | Kasada |
| 10,403,320 B2 | 9/2019 | Kasada et al. |
| 10,410,666 B2 | 9/2019 | Kasada et al. |
| 10,431,248 B2 | 10/2019 | Kasada et al. |
| 10,431,249 B2 | 10/2019 | Kasada et al. |
| 10,431,250 B2 | 10/2019 | Tada et al. |
| 10,438,624 B2 | 10/2019 | Kasada |
| 10,438,625 B2 | 10/2019 | Ozawa et al. |
| 10,438,628 B2 | 10/2019 | Kasada et al. |
| 10,453,488 B2 | 10/2019 | Kurokawa et al. |
| 10,460,756 B2 | 10/2019 | Kasada et al. |
| 10,475,481 B2 | 11/2019 | Oyanagi et al. |
| 10,477,072 B2 | 11/2019 | Kasada |
| 10,482,913 B2 | 11/2019 | Kasada |
| 10,490,220 B2 | 11/2019 | Kasada et al. |
| 10,497,384 B2 | 12/2019 | Kasada et al. |
| 10,497,388 B2 | 12/2019 | Ozawa et al. |
| 10,510,366 B2 | 12/2019 | Kaneko et al. |
| 10,515,657 B2 * | 12/2019 | Kasada .................. G11B 5/48 |
| 10,515,660 B2 | 12/2019 | Oyanagi et al. |
| 10,515,661 B2 | 12/2019 | Kasada et al. |
| 10,522,171 B2 | 12/2019 | Kasada et al. |
| 10,522,180 B2 | 12/2019 | Kasada |
| 10,546,602 B2 | 1/2020 | Kasada et al. |
| 10,573,338 B2 | 2/2020 | Kasada et al. |
| 10,643,646 B2 | 5/2020 | Kasada et al. |
| 10,672,426 B2 * | 6/2020 | Kasada .................. G11B 5/706 |
| 10,706,875 B2 | 7/2020 | Kasada et al. |
| 10,720,181 B1 | 7/2020 | Yamaga et al. |
| 10,755,741 B2 | 8/2020 | Ozawa et al. |
| 10,839,850 B2 | 11/2020 | Tada et al. |
| 10,854,231 B2 * | 12/2020 | Kasada .............. G11B 5/70678 |
| 10,854,233 B2 * | 12/2020 | Ozawa .............. G11B 5/70678 |
| 10,854,234 B2 * | 12/2020 | Kasada ............ G11B 5/00813 |
| 10,878,846 B2 * | 12/2020 | Kasada .................. G11B 5/70 |
| 10,891,982 B2 * | 1/2021 | Kasada .................. G11B 5/70 |
| 11,158,340 B2 | 10/2021 | Bradshaw |
| 2001/0012574 A1 | 8/2001 | Matsubayashi et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0017366 A1 | 1/2003 | Takahashi et al. |
| 2003/0059649 A1 | 3/2003 | Saliba et al. |
| 2003/0091866 A1 | 5/2003 | Ejiri et al. |
| 2003/0121284 A1 | 7/2003 | Ikeda et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0203240 A1 | 10/2003 | Seng et al. |
| 2003/0228492 A1 | 12/2003 | Ejiri et al. |
| 2003/0228493 A1 | 12/2003 | Doushita et al. |
| 2004/0013892 A1 | 1/2004 | Yano et al. |
| 2004/0018388 A1 | 1/2004 | Kitamura et al. |
| 2004/0023066 A1 | 2/2004 | Watase et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0020803 A1 | 1/2005 | MacHida et al. |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0083954 A1 | 4/2006 | Meguro et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |

(56) References Cited

U.S. PATENT DOCUMENTS

| | | |
|---|---|---|
| 2009/0027812 A1 | 1/2009 | Noguchi et al. |
| 2009/0087689 A1 | 4/2009 | Doushita et al. |
| 2009/0142625 A1 | 6/2009 | Fukushima et al. |
| 2009/0161249 A1 | 6/2009 | Takayama et al. |
| 2009/0162701 A1 | 6/2009 | Jensen et al. |
| 2009/0174970 A1 | 7/2009 | Inoue et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2010/0284105 A1 | 11/2010 | Dugas et al. |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0229739 A1 | 9/2011 | Jensen et al. |
| 2011/0244272 A1 | 10/2011 | Suzuki et al. |
| 2012/0003503 A1 | 1/2012 | Mori |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mon et al. |
| 2012/0251845 A1 | 10/2012 | Wang et al. |
| 2012/0314319 A1 | 12/2012 | Olson et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0279404 A1 | 10/2015 | Aoshima et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0171993 A1 | 6/2016 | Okubo |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0092316 A1 | 3/2017 | Imamura et al. |
| 2017/0130156 A1 | 5/2017 | Kondo et al. |
| 2017/0162220 A1 | 6/2017 | Nakashio et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0278533 A1 | 9/2017 | Kasada et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0137887 A1 | 5/2018 | Sekiguchi et al. |
| 2018/0147626 A1 | 5/2018 | Shirata et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374503 A1* | 12/2018 | Kasada .................. G11B 5/735 |
| 2018/0374504 A1* | 12/2018 | Kasada .............. G11B 5/70615 |
| 2018/0374505 A1* | 12/2018 | Kasada .................. G11B 5/702 |
| 2018/0374506 A1* | 12/2018 | Kasada .................. G11B 5/702 |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027177 A1 | 1/2019 | Kasada |
| 2019/0027178 A1 | 1/2019 | Kasada |
| 2019/0035424 A1 | 1/2019 | Endo |

(56) References Cited

U.S. PATENT DOCUMENTS

| | | | |
|---|---|---|---|
| 2019/0051325 A1 | 2/2019 | Kasada et al. | |
| 2019/0088278 A1 | 3/2019 | Kasada et al. | |
| 2019/0096437 A1 | 3/2019 | Ozawa et al. | |
| 2019/0103130 A1 | 4/2019 | Kasada et al. | |
| 2019/0103131 A1 | 4/2019 | Kasada et al. | |
| 2019/0103133 A1 | 4/2019 | Ozawa et al. | |
| 2019/0103134 A1 | 4/2019 | Kasada et al. | |
| 2019/0103135 A1* | 4/2019 | Ozawa | G11B 5/735 |
| 2019/0130936 A1 | 5/2019 | Kaneko et al. | |
| 2019/0259416 A1 | 8/2019 | Kawakami et al. | |
| 2019/0295581 A1 | 9/2019 | Kasada | |
| 2019/0295586 A1 | 9/2019 | Kasada | |
| 2019/0295587 A1 | 9/2019 | Kasada | |
| 2019/0295588 A1* | 9/2019 | Kasada | G11B 5/78 |
| 2019/0295589 A1* | 9/2019 | Kasada | G11B 5/735 |
| 2019/0295590 A1 | 9/2019 | Kaneko et al. | |
| 2019/0304496 A1 | 10/2019 | Fujimoto | |
| 2020/0005814 A1 | 1/2020 | Kasada et al. | |
| 2020/0005818 A1 | 1/2020 | Kasada et al. | |
| 2020/0005827 A1 | 1/2020 | Ozawa et al. | |
| 2020/0035262 A1 | 1/2020 | Kasada | |
| 2020/0035265 A1 | 1/2020 | Kasada | |
| 2020/0035267 A1* | 1/2020 | Kasada | G11B 5/70605 |
| 2020/0211592 A1 | 7/2020 | Kasada | |
| 2020/0211593 A1* | 7/2020 | Kasada | G11B 5/70689 |
| 2020/0227081 A1* | 7/2020 | Hosoda | G11B 5/70678 |
| 2020/0227084 A1* | 7/2020 | Iwamoto | G11B 5/714 |
| 2020/0243110 A1 | 7/2020 | Kasada | |
| 2020/0251134 A1* | 8/2020 | Kasada | G11B 5/78 |
| 2020/0251135 A1 | 8/2020 | Kasada et al. | |
| 2020/0251139 A1 | 8/2020 | Kasada et al. | |
| 2020/0342904 A1 | 10/2020 | Yamaga et al. | |
| 2021/0012800 A1 | 1/2021 | Yamaga et al. | |
| 2021/0020195 A1 | 1/2021 | Kasada | |
| 2021/0082462 A1 | 3/2021 | Bradshaw | |
| 2021/0082463 A1* | 3/2021 | Ozawa | G11B 5/733 |
| 2021/0082464 A1 | 3/2021 | Ozawa et al. | |
| 2021/0090599 A1 | 3/2021 | Nakano et al. | |
| 2021/0125634 A1 | 4/2021 | Yamaga et al. | |
| 2021/0249043 A1 | 8/2021 | Kasada et al. | |
| 2021/0280212 A1 | 9/2021 | Kasada | |
| 2021/0287712 A1 | 9/2021 | Iwamoto et al. | |
| 2021/0295865 A1 | 9/2021 | Kasada et al. | |
| 2021/0335387 A1 | 10/2021 | Kasada | |
| 2021/0358521 A1 | 11/2021 | Kasada | |
| 2022/0036918 A1* | 2/2022 | Kasada | G11B 5/702 |

FOREIGN PATENT DOCUMENTS

| | | |
|---|---|---|
| CN | 1691139 A | 11/2005 |
| CN | 1914275 A | 2/2007 |
| CN | 101105949 A | 1/2008 |
| CN | 102459429 A | 5/2012 |
| CN | 105324650 A | 2/2016 |
| DE | 33 40 381 A1 | 5/1984 |
| DE | 101 46 429 A1 | 3/2002 |
| EP | 0 102 581 A2 | 3/1984 |
| EP | 0 387 420 A2 | 9/1990 |
| EP | 0 416 656 A2 | 3/1991 |
| EP | 0 421 213 A2 | 4/1991 |
| EP | 0 520 155 B1 | 8/1996 |
| GB | 2495356 A | 4/2013 |
| JP | 59-221830 A | 12/1984 |
| JP | 60-66316 A | 4/1985 |
| JP | 60-171626 A | 9/1985 |
| JP | 61-11924 A | 1/1986 |
| JP | 61-139923 A | 6/1986 |
| JP | 61-139932 A | 6/1986 |
| JP | 62-117138 A | 5/1987 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 64-60820 A | 3/1989 |
| JP | 1-276424 A | 11/1989 |
| JP | 1-318953 A | 12/1989 |
| JP | 2-108232 A | 4/1990 |
| JP | 2-168415 A | 6/1990 |
| JP | 2-227821 A | 9/1990 |
| JP | 3-109701 A | 5/1991 |
| JP | 4-123312 A | 4/1992 |
| JP | 5-258283 A | 10/1993 |
| JP | 5-267409 A | 10/1993 |
| JP | 5-298653 A | 11/1993 |
| JP | 7-57242 A | 3/1995 |
| JP | 7-114723 A | 5/1995 |
| JP | 7-244834 A | 9/1995 |
| JP | 7-326044 A | 12/1995 |
| JP | H08-007256 A | 1/1996 |
| JP | 9-73626 A | 3/1997 |
| JP | 9-190623 A | 7/1997 |
| JP | 10-149788 A | 6/1998 |
| JP | 10-303199 A | 11/1998 |
| JP | 11-073630 A | 3/1999 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-90429 A | 3/2000 |
| JP | 2000-241319 A | 9/2000 |
| JP | 2000-251240 A | 9/2000 |
| JP | 2002-8910 A | 1/2002 |
| JP | 2002-157726 A | 5/2002 |
| JP | 2002-222515 A | 8/2002 |
| JP | 2002-298332 A | 10/2002 |
| JP | 2002-329605 A | 11/2002 |
| JP | 2002-347197 A | 12/2002 |
| JP | 2002-367142 A | 12/2002 |
| JP | 2002-367318 A | 12/2002 |
| JP | 2002-373414 A | 12/2002 |
| JP | 2003-77116 A | 3/2003 |
| JP | 2003-296918 A | 10/2003 |
| JP | 2003-323710 A | 11/2003 |
| JP | 2004-5793 A | 1/2004 |
| JP | 2004-005820 A | 1/2004 |
| JP | 2004-55137 A | 2/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-25870 A | 1/2005 |
| JP | 2005-029656 A | 2/2005 |
| JP | 2005-038579 A | 2/2005 |
| JP | 2005-209265 A | 8/2005 |
| JP | 2005-243063 A | 9/2005 |
| JP | 2005-243162 A | 9/2005 |
| JP | 2006-54018 A | 2/2006 |
| JP | 2006-92672 A | 4/2006 |
| JP | 2006-234835 A | 9/2006 |
| JP | 2006-257434 A | 9/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-294085 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-32338 A | 2/2009 |
| JP | 2009-093738 A | 4/2009 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-134372 A | 7/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |

(56) References Cited

FOREIGN PATENT DOCUMENTS

| | | | |
|---|---|---|---|
| JP | 2012-203955 | A | 10/2012 |
| JP | 2012-203956 | A | 10/2012 |
| JP | 2013-25853 | A | 2/2013 |
| JP | 2013-77360 | A | 4/2013 |
| JP | 2013-164889 | A | 8/2013 |
| JP | 2014-15453 | A | 1/2014 |
| JP | 2014-179149 | A | 9/2014 |
| JP | 2015-39801 | A | 3/2015 |
| JP | 2015-111484 | A | 6/2015 |
| JP | 2015-201241 | A | 11/2015 |
| JP | 2016-15183 | A | 1/2016 |
| JP | 2016-502224 | A | 1/2016 |
| JP | 2016-051493 | A | 4/2016 |
| JP | 2016-071912 | A | 5/2016 |
| JP | 2016-71926 | A | 5/2016 |
| JP | 2016-110680 | A | 6/2016 |
| JP | 2016-126817 | A | 7/2016 |
| JP | 2016-139451 | A | 8/2016 |
| JP | 2016-177851 | A | 10/2016 |
| JP | 2017-16732 | A | 1/2017 |
| JP | 2017-041291 | A | 2/2017 |
| JP | 2017-041296 | A | 2/2017 |
| JP | 2017-174475 | A | 9/2017 |
| JP | 2017-228328 | A | 12/2017 |
| JP | 2017-228331 | A | 12/2017 |
| JP | 2018-73454 | A | 5/2018 |
| JP | 2018-92693 | A | 6/2018 |
| JP | 2019-08847 | A | 1/2019 |
| JP | 2019-169230 | A | 10/2019 |
| WO | 2019/065199 | A1 | 4/2019 |
| WO | 2019/065200 | A1 | 4/2019 |

OTHER PUBLICATIONS

Notice of Allowance dated Dec. 2, 2020 in U.S. Appl. No. 16/361,797.
Notice of Allowance dated Oct. 1, 2020 in U.S. Appl. No. 16/777,201.
Notice of Allowance dated Sep. 16, 2020 in U.S. Appl. No. 16/848,331.
Notice of Allowance dated Mar. 3, 2021 in U.S. Appl. No. 16/361,814.
Office Action dated Mar. 2, 2021 in U.S. Appl. No. 16/727,205.
Ridaoui et al., "Effect of Cationic Surfactant and Block Copolymer on Carbon Black Particle Surface Charge and Size", Colloids and Surfaces A: Physiochemical and Engineering Aspects, vol. 278, Elsevier, Jan. 18, 2006, pp. 149-159 (12 pages total).
English translation of JP H08-7256 published Jan. 12, 1996 provided by Espacenet.
Office Action dated Mar. 23, 2021 in Japanese Application No. 2020-208023, corresponds to U.S. Appl. No. 16/361,814.
Office Action dated Mar. 23, 2021 in Japanese Application No. 2020-208022, corresponds to U.S. Appl. No. 16/361,570.
Notice of Allowance issued Jul. 8, 2021 in US Application No. 16/009,461.
US Application No. 17/500,337 filed Oct. 13, 2021 (Kasada).
Notice of Allowance issued Oct. 20, 2021 in US Application No. 16/727,205.
Office Action issued Oct. 26, 2021 in Japanese Application No. 2018-246873; corresponds to US16/727,205 English.
International Preliminary Report on Patentability dated Mar. 31, 2020 from the International Bureau in International Application No. PCT/JP2018/033531, corresponding to U.S. Appl. No. 16/832,788.
International Preliminary Report on Patentability dated Mar. 31, 2020 in International Application No. PCT/JP2018/033530, corresponding to U.S. Appl. No. 16/832,284.
International Search Report dated Nov. 20, 2018 from the International Searching Authority in International Application No. PCT/JP2018/033531, corresponding to U.S. Appl. No. 16/832,788.
International Search Report dated Nov. 20, 2018 in International Application No. PCT/JP2018/033530, corresponding to U.S. Appl. No. 16/832,284.
Notice of Allowance dated Jul. 28, 2020 in U.S. Appl. No. 16/361,589.
Notice of Allowance dated Jul. 29, 2020 in U.S. Appl. No. 16/361,597.
Notice of Allowance dated Jun. 23, 2020 in U.S. Appl. No. 16/522,894.
Notice of Allowance dated Nov. 12, 2020 in U.S. Appl. No. 16/777,411.
Notice of Allowance dated Nov. 4, 2020 in U.S. Appl. No. 16/727,181.
Notice of Allowance dated Nov. 5, 2020 in U.S. Appl. No. 16/361,597.
Notice of Allowance dated Sep. 17, 2020 in U.S. Appl. No. 16/522,867.
Office Action dated Jul. 20, 2020 in U.S. Appl. No. 16/777,411.
Office Action dated Jun. 25, 2020 in U.S. Appl. No. 16/727,181.
Office Action dated Mar. 13, 2020 in U.S. Appl. No. 16/361,589.
Office Action dated Mar. 13, 2020 in U.S. Appl. No. 16/361,597.
Office Action dated Mar. 2, 2020 in U.S. Appl. No. 16/522,894.
Office Action dated Nov. 3, 2020 in Chinese Application No. 201880063019.7; corresponds to U.S. Appl. No. 16/832,788.
Office Action dated Nov. 6, 2020 in Chinese Application No. 201880062980.4; corresponds to U.S. Appl. No. 16/832,284.
Office Action dated Sep. 15, 2020 in U.S. Appl. No. 16/832,284.
Office Action dated Sep. 15, 2020 in U.S. Appl. No. 16/832,788.
Office Action dated Sep. 23, 2020 in Japanese Application No. 2019-050201, corresponds to U.S. Appl. No. 16/361,589.
Office Action dated Sep. 29, 2020 in Japanese Application No. 2018-141866, corresponds to U.S. Appl. No. 16/522,867.
Office Action dated Sep. 29, 2020 in Japanese Application No. 2018-141867, corresponds to U.S. Appl. No. 16/522,894.
Office Action dated Sep. 29, 2020 in Japanese Application No. 2018-246871, corresponds to U.S. Appl. No. 16/727,181.
Written Opinion dated Nov. 20, 2018 from the International Bureau in International Application No. PCT/JP2018/033531, corresponding to U.S. Appl. No. 16/832,788.
Written Opinion dated Nov. 20, 2018 from the International Bureau in International Application No. PCT/JP2018/033530, corresponding to U.S. Appl. No. 16/832,284.
Notice of Allowance dated Dec. 31, 2020 in U.S. Appl. No. 16/361,589.
Notice of Allowance dated Dec. 9, 2020 in U.S. Appl. No. 16/727,181.
Notice of Allowance dated Apr. 28, 2021 in U.S. Appl. No. 16/361,589.
Notice of Allowance dated Apr. 7, 2021 in U.S. Appl. No. 16/361,597.
Notice of Allowance dated Aug. 17, 2021 in U.S. Appl. No. 17/032,621.
Notice of Allowance dated Feb. 26, 2021 in U.S. Appl. No. 16/777,411.
Notice of Allowance dated Feb. 3, 2021 in U.S. Appl. No. 16/832,284.
Notice of Allowance dated Mar. 8, 2021 in U.S. Appl. No. 16/727,181.
Notice of Allowance dated Mar. 9, 2021 in U.S. Appl. No. 16/522,894.
Notice of Allowance dated Sep. 30, 2021 in U.S. Appl. No. 16/522,894.
Office Action dated Apr. 19, 2021 in U.S. Appl. No. 17/032,621.
Office Action dated Aug. 23, 2021 in U.S. Appl. No. 16/777,411.
Office Action dated Jun. 17, 2021 in U.S. Appl. No. 16/522,894.
Office Action dated Oct. 28, 2021 in U.S. Appl. No. 17/326,458.
Office Action dated Oct. 4, 2021 in U.S. Appl. No. 17/328,620.
Notice of Allowance dated Feb. 3, 2021 in U.S. Appl. No. 16/832,788.
Office Action dated Jul. 15, 2021 in U.S. Appl. No. 16/832,788.
Notice of Allowance dated Nov. 16, 2021 in U.S. Appl. No. 16/832,788.
Office Action dated Mar. 13, 2020 in U.S. Appl. No. 16/522,867.
U.S. Appl. No. 17/326,458 filed May 21, 2021 (Iwamoto).
U.S. Appl. No. 17/328,620 filed May 24, 2021 (Kasada).
U.S. Appl. No. 17/330,680 filed May 26, 2021 (Kasada).
U.S. Appl. No. 17/368,274 filed Jul. 6, 2021 (Kasada).
U.S. Appl. No. 17/386,616 filed Jul. 28, 2021 (Kasada).
Advisory Action dated Jul. 5, 2018 in U.S. Appl. No. 14/838,663.
Office Action dated Apr. 26, 2017 in U.S. Appl. No. 15/388,864.
Office Action dated Aug. 10, 2017, in U.S. Appl. No. 14/870,618.
Office Action dated Aug. 3, 2018 in U.S. Appl. No. 15/388,911.
Office Action dated Feb. 4, 2016 in U.S. Appl. No. 14/753,227.
Office Action dated Jun. 7, 2018 in U.S. Appl. No. 15/380,309.
Office Action dated May 2, 2018, in U.S. Appl. No. 15/280,195.
Office Action dated May 4, 2018, in U.S. Appl. No. 15/422,944.
Office Action dated May 4, 2018, in U.S. Appl. No. 15/625,428.
Office Action dated May 7, 2018, in U.S. Appl. No. 15/624,792.

(56) References Cited

OTHER PUBLICATIONS

Office Action dated May 7, 2018, in U.S. Appl. No. 15/624,897.
Office Action dated May 7, 2018, in U.S. Appl. No. 15/626,832.
Office Action dated Nov. 16, 2016 in U.S. Appl. No. 15/072,550.
Office Action dated Oct. 12, 2018, in U.S. Appl. No. 15/626,355.
Office Action dated Oct. 12, 2018, in U.S. Appl. No. 15/627,696.
Office Action dated Oct. 15, 2018, in U.S. Appl. No. 15/619,012.
Office Action dated Oct. 22, 2018, in U.S. Appl. No. 15/854,439.
Office Action dated Oct. 9, 2018, in U.S. Appl. No. 15/628,814.
Office Action dated Sep. 24, 2018, in U.S. Appl. No. 15/690,400.
Office Action dated Sep. 27, 2018, in U.S. Appl. No. 15/690,906.
Office Action dated Sep. 27, 2018, in U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 in U.S. Appl. No. 15/388,864.
Office Action dated May 30, 2018 in U.S. Appl. No. 15/388,911.
Office Action dated Nov. 18, 2016 in U.S. Appl. No. 14/753,227.
Office Action dated Aug. 15, 2016 in U.S. Appl. No. 14/753,227.
"Introduction to TMR Magnetic Sensors", Anonymous, Mar. 12, 2015, MR Sensor Technology, pp. 1- 5 (Year: 2015).
Notice of Allowance dated Apr. 25, 2017 in U.S. Appl. No. 15/072,550.
Notice of Allowance dated Apr. 27, 2017, in U.S. Appl. No. 15/052,115.
Notice of Allowance dated Apr. 5, 2018, in U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, in U.S. Appl. No. 15/466,143.
Notice of Allowance dated Aug. 6, 2018, in U.S. Appl. No. 15/920,768.
Notice of Allowance dated Aug. 9, 2018, in U.S. Appl. No. 15/920,563.
Notice of Allowance dated Dec. 2, 2016 in U.S. Appl. No. 14/753,227.
Notice of Allowance dated Dec. 3, 2018, in U.S. Appl. No. 15/920,518.
Notice of Allowance dated Dec. 4, 2018, in U.S. Appl. No. 15/625,428.
Notice of Allowance dated Feb. 14, 2018, in U.S. Appl. No. 14/870,618.
Notice of Allowance dated Jul. 12, 2017 in U.S. Appl. No. 15/388,864.
Notice of Allowance dated Jul. 13, 2018, in U.S. Appl. No. 15/920,782.
Notice of Allowance dated Jun. 2, 2017, in U.S. Appl. No. 15/218,190.
Notice of Allowance dated Jun. 28, 2017, in U.S. Appl. No. 15/464,991.
Notice of Allowance dated Mar. 14, 2018, in U.S. Appl. No. 15/854,474.
Notice of Allowance dated Mar. 16, 2018 in U.S. Appl. No. 15/854,410.
Notice of Allowance dated May 10, 2018 in U.S. Appl. No. 15/615,871.
Notice of Allowance dated May 8, 2017, in U.S. Appl. No. 14/757,555.
Notice of Allowance dated May 8, 2017, in U.S. Appl. No. 14/978,834.
Notice of Allowance dated Oct. 11, 2018, in U.S. Appl. No. 15/380,336.
Notice of Allowance dated Oct. 11, 2018, in U.S. Appl. No. 15/422,944.
Notice of Allowance dated Oct. 11, 2018, in U.S. Appl. No. 15/624,792.
Notice of Allowance dated Oct. 11, 2018, in U.S. Appl. No. 15/624,897.
Notice of Allowance dated Oct. 12, 2018, in U.S. Appl. No. 15/626,832.
Notice of Allowance dated Oct. 6, 2016, in U.S. Appl. No. 14/209,065.
Notice of Allowance dated Sep. 24, 2018, in U.S. Appl. No. 15/854,438.
Notice of Allowance dated Sep. 4, 2018, in U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance issued Jan. 17, 2019 in US Application No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, in U.S. Appl. No. 15/854,438.
Office Action dated Dec. 14, 2018, in U.S. Appl. No. 15/920,517.
Office Action dated Dec. 17, 2018, in U.S. Appl. No. 15/920,515.
Office Action dated Dec. 17, 2018, in U.S. Appl. No. 15/920,533.
Office Action dated Dec. 17, 2018, in U.S. Appl. No. 15/920,538.
Office Action dated Dec. 17, 2018, in U.S. Appl. No. 15/920,544.
Office Action dated Dec. 20, 2018, in U.S. Appl. No. 15/900,164.
Office Action dated Dec. 21, 2018, in U.S. Appl. No. 15/900,230.
Office Action dated Feb. 25, 2016, in U.S. Appl. No. 14/867,752.

(56) References Cited

OTHER PUBLICATIONS

Office Action dated Jan. 27, 2015 from the Japanese Patent Office in Japanese Application No. 2013-053543.
Office Action dated Jan. 31, 2018, in U.S. Appl. No. 14/867,752.
Office Action dated Jul. 3, 2018, in U.S. Appl. No. 15/920,518.
Office Action dated Jul. 6, 2015, in U.S. Appl. No. 14/209,065.
Office Action dated Jul. 6, 2018 from the United States Patent and Trademark Office in U.S. Appl. No. 15/848,173.
Office Action dated Mar. 13, 2015, in U.S. Appl. No. 14/209,065.
Office Action dated Mar. 16, 2017, in U.S. Appl. No. 14/867,752.
Office Action dated Mar. 24, 2016, in U.S. Appl. No. 14/209,065.
Office Action dated May 4, 2018 in U.S. Appl. No. 15/422,821.
Office Action dated Nov. 28, 2018, in U.S. Appl. No. 15/899,587.
Office Action dated Nov. 28, 2018, in U.S. Appl. No. 15/900,080.
Office Action dated Nov. 28, 2018, in U.S. Appl. No. 15/900,144.
Office Action dated Nov. 29, 2018, in U.S. Appl. No. 15/380,309.
Office Action dated Nov. 29, 2018, in U.S. Appl. No. 15/422,821.
Office Action dated Nov. 8, 2016 from the Japanese Patent Office in Japanese Application No. 2014-199022.
Office Action dated Oct. 15, 2018, in U.S. Appl. No. 15/854,403.
Office Action dated Oct. 19, 2016, in U.S. Appl. No. 14/867,752.
Office Action dated Oct. 3, 2018 from the United States Patent and Trademark Office in U.S. Appl. No. 15/280,195.
Office Action dated Sep. 10, 2015, in U.S. Appl. No. 14/209,065.
Office Action dated Sep. 19, 2014, in U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, in U.S. Appl. No. 15/854,409.
Office Action dated Sep. 7, 2017, in U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.

(56) References Cited

OTHER PUBLICATIONS

Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 5, 2017 in U.S. Appl. No. 15/241,286.
Office Action dated Oct. 5, 2017 in U.S. Appl. No. 15/241,631.
Office Action dated Oct. 5, 2017 in U.S. Appl. No. 15/378,907.
Office Action dated Oct. 5, 2017 in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/142,560.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Office Action dated Aug. 25, 2020 in Chinese Application No. 201711439496.2.
Office Action dated Jul. 8, 2020 in U.S. Appl. No. 15/442,961.
Notice of Allowance dated Sep. 23, 2020 in U.S. Appl. No. 15/443,094.
Notice of Allowance dated Nov. 13, 2020 in U.S. Appl. No. 15/442,961.
Office Action dated Dec. 2, 2021 in U.S. Appl. No. 17/330,680.
Office Action dated Dec. 7, 2021 in Japanese Application No. 2019-016529.
Notice of Allowance dated Dec. 15, 2021 in U.S. Appl. No. 16/777,411.
Notice of Allowance dated Jan. 5, 2022 in U.S. Appl. No. 17/328,620.
Notice of Allowance dated Jan. 5, 2022 in U.S. Appl. No. 16/727,181.
Notice of Allowance dated Jan. 7, 2022 in U.S. Appl. No. 16/522,894.
Notice of Allowance dated Jan. 24, 2022 in U.S. Appl. No. 17/032,621.
Notice of Allowance dated Jan. 25, 2022 in U.S. Appl. No. 16/361,814.
Notice of Allowance dated Jan. 27, 2022 in U.S. Appl. No. 16/361,797.
Office Action dated Apr. 27, 2021 in Japanese Application No. 2020-122792, corresponds to U.S. Appl. No. 17/021,529.
Office Action dated Nov. 9, 2021 in U.S. Appl. No. 17/021,529.
Office Action dated Mar. 22, 2022 in Chinese Application No. 202110765961.1, corresponds to U.S. Appl. No. 16/832,284.
Office Action dated Apr. 19, 2022 in Japanese Application No. 2020-122807, corresponds to U.S. Appl. 16/522,894.
Office Action dated Feb. 1, 2022 in U.S. Appl. No. 16/832,788.
Notice of Allowance dated Feb. 8, 2022 in U.S. Appl. No. 16/361,589.
Notice of Allowance dated Feb. 9, 2022 in U.S. Appl. No. 16/361,597.
Notice of Allowance dated Feb. 16, 2022 in U.S. Appl. No. 16/832,284.
Office Action dated Mar. 1, 2022 in U.S. Appl. No. 16/009,461.
Notice of Allowance dated Mar. 4, 2022 in U.S. Appl. No. 16/777,411.
Office Action dated Mar. 16, 2022 in U.S. Appl. No. 16/361,797.
Notice of Allowance dated Mar. 16, 2022 in U.S. Appl. No. 17/330,680.
Office Action dated Mar. 18, 2022 in U.S. Appl. No. 16/361,814.
Notice of Allowance dated Mar. 22, 2022 in U.S. Appl. No. 17/032,621.
Notice of Allowance dated Mar. 23, 2022 in U.S. Appl. No. 17/328,620.
Notice of Allowance dated Mar. 24, 2022 in U.S. Appl. No. 16/727,205.
Notice of Allowance dated Mar. 29, 2022 in U.S. Appl. No. 16/727,181.
Notice of Allowance dated Apr. 5, 2022 in U.S. Appl. No. 17/326,458.
Notice of Allowance dated Apr. 6, 2022 in U.S. Appl. No. 17/021,529.
Notice of Allowance dated Apr. 12, 2022 in U.S. Appl. No. 16/522,894.

(56) References Cited

OTHER PUBLICATIONS

Office Action dated Apr. 13, 2022 in U.S. Appl. No. 17/368,274.
Notice of Allowance dated May 26, 2022 in U.S. Appl. No. 17/326,458.
Office Action dated Jun. 8, 2022 in U.S. Appl. No. 17/386,616.
Notice of Allowance dated Jun. 27, 2022 in U.S. Appl. No. 16/009,461.
Notice of Allowance dated Jul. 6, 2022 in U.S. Appl. No. 16/832,788.
Notice of Allowance dated Jul. 13, 2022 in U.S. Appl. No. 16/361,814.
Notice of Allowance dated Jul. 15, 2022 in U.S. Appl. No. 16/361,797.
Office Action dated Aug. 17, 2022 in U.S. Appl. No. 17/500,337.
Notice of Allowance dated Aug. 24, 2022 in U.S. Appl. No. 17/368,274.

* cited by examiner

MAGNETIC TAPE HAVING CHARACTERIZED MAGNETIC LAYER, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2018-198191 filed on Oct. 22, 2018. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up.
The recording of information on a magnetic tape and/or reproducing of the information on the magnetic tape is normally performed by setting a magnetic tape cartridge in which the magnetic tape is accommodated, in a drive, and causing the magnetic tape to run in the drive to bring a surface of the magnetic tape (surface of magnetic layer) and a magnetic head (hereinafter, also simply referred to as a "head") into contact with each other and slide on each other. As the magnetic tape, a magnetic tape having a configuration in which a magnetic layer including an abrasive, in addition to ferromagnetic powder and a binding agent is provided on a non-magnetic layer is widely used (for example, see JP2005-243162A).

SUMMARY OF THE INVENTION

As one performance desired for a magnetic tape, excellent electromagnetic conversion characteristics that can be exhibited during the reproducing of information recorded on the magnetic tape is exemplified. However, in a case where chipping of a surface of a magnetic layer and/or a head occurs, during the sliding between the surface of the magnetic layer and the head is repeated, a phenomenon in that a distance between the surface of the magnetic layer and a reproducing element of the head increases (so-called spacing loss) may occur. In regards to this point, as disclosed in JP2005-243162A, an abrasive included in the magnetic layer can contribute to applying of head cleaning properties to the surface of the magnetic layer by the abrasive. By apply applying head cleaning properties to the surface of the magnetic layer, it is possible to prevent occurrence of spacing loss caused by a foreign material generated by the chipping of the surface of the magnetic layer present between the surface of the magnetic layer and the head. On the other hand, as the head cleaning properties of the surface of the magnetic layer is increased, the chipping of the head easily occurs due to the sliding on the surface of the magnetic layer, and the spacing loss may occur. Such spacing loss may be a reason for a phenomenon in that the electromagnetic conversion characteristics are deteriorated, during the reproducing of the information recorded on the magnetic tape is repeated (hereinafter, also referred to as a "deterioration in electromagnetic conversion characteristics during the repeated reproducing").

Meanwhile, the magnetic tape is normally used to be accommodated and circulated in a magnetic tape cartridge. In order to increase recording capacity for one reel of the magnetic tape cartridge, it is desired to increase a total length of the magnetic tape accommodated in one reel of the magnetic tape cartridge. In order to increase the total length of the magnetic tape, it is necessary that the magnetic tape is thinned (hereinafter, referred to as "thinning"). As a method for thinning the magnetic tape, a method of decreasing a total thickness of a non-magnetic layer and a magnetic layer of a magnetic tape including the non-magnetic layer and the magnetic layer on a non-magnetic support in this order is used. However, the inventors have conducted studies and found that, in a magnetic tape in which a total thickness of a non-magnetic layer and a magnetic layer is decreased to be equal to or smaller than 0.60 µm, a deterioration in electromagnetic conversion characteristics during the repeated reproducing easily occurs in a low temperature and high humidity environment, compared to a magnetic tape in which a total thickness of a non-magnetic layer and a magnetic layer is greater than 0.60 µm. In order to use a magnetic tape in a low temperature and high humidity environment, it is desired to prevent a deterioration in electromagnetic conversion characteristics during the repeated reproducing in such an environment.

One aspect of the invention provides for a magnetic tape having a total thickness of a non-magnetic layer and a magnetic layer of equal to or smaller than 0.60 µm, in which a deterioration in electromagnetic conversion characteristics during the repeated reproducing in a low temperature and high humidity environment is slight.

According to one aspect of the invention, there is provided a magnetic tape comprising: a non-magnetic support; a non-magnetic layer including a non-magnetic powder and a binding agent on the non-magnetic support; and a magnetic layer including a ferromagnetic powder and a binding agent on the non-magnetic layer, in which a total thickness of the non-magnetic layer and the magnetic layer is equal to or smaller than 0.60 µm, an isoelectric point of a surface zeta potential of the magnetic layer is equal to or greater than 5.5, the magnetic layer includes an oxide abrasive, and an average particle diameter of the oxide abrasive obtained from a secondary ion image obtained by irradiating the surface of the magnetic layer with a focused ion beam (FIB) (hereinafter, also referred to as a "FIB abrasive diameter") is 0.04 µm to 0.08 µm.

In one embodiment, the isoelectric point may be 5.5 to 7.0.

In one embodiment, the magnetic layer may include a binding agent having an acidic group.

In one embodiment, the acidic group may be at least one kind of acidic group selected from the group consisting of a sulfonic acid group and a salt thereof.

In one embodiment, the oxide abrasive may be an alumina powder.

In one embodiment, the total thickness of the non-magnetic layer and the magnetic layer may be 0.15 µm to 0.60 µm.

In one embodiment, the magnetic tape may further comprise a back coating layer including a non-magnetic powder and a binding agent on a surface of the non-magnetic support opposite to a surface provided with the magnetic layer.

According to another aspect of the invention, there is provided a magnetic tape cartridge comprising: the magnetic tape described above.

According to still another aspect of the invention, there is provided a magnetic tape apparatus comprising: the magnetic tape described above; and a magnetic head.

According to one aspect of the invention, it is possible to provide a magnetic tape having a total thickness of a non-magnetic layer and a magnetic layer of equal to or smaller than 0.60 µm, in which a deterioration in electromagnetic conversion characteristics during the repeated reproducing in a low temperature and high humidity environment can be prevented. In addition, according to the other aspect of the invention, it is possible to provide a magnetic tape cartridge and a magnetic tape apparatus including the magnetic tape.

DESCRIPTION OF THE PREFERRED EMBODIMENTS

Magnetic Tape

One aspect of the invention relates to a magnetic tape including: a non-magnetic support; a non-magnetic layer including a non-magnetic powder and a binding agent on the non-magnetic support; and a magnetic layer including a ferromagnetic powder and a binding agent on the non-magnetic layer, in which a total thickness of the non-magnetic layer and the magnetic layer is equal to or smaller than 0.60 µm, an isoelectric point of a surface zeta potential of the magnetic layer is equal to or greater than 5.5, the magnetic layer includes an oxide abrasive, and an average particle diameter of the oxide abrasive obtained from a secondary ion image obtained by irradiating the surface of the magnetic layer with a focused ion beam (FIB abrasive diameter) is 0.04 µm to 0.08 µm.

In the invention and the specification, the "surface of the magnetic layer" is identical to the surface of the magnetic tape on the magnetic layer side.

In the invention and the specification, the isoelectric point of the surface zeta potential of the magnetic layer is a value of pH, in a case where a surface zeta potential of the magnetic layer measured by a flow potential method (also referred to as a flow current method) becomes zero. A sample is cut out from the magnetic tape which is a measurement target, and the sample is disposed in a measurement cell so that the surface of the magnetic layer which is a target surface for obtaining the surface zeta potential comes into contact with an electrolyte. Pressure in the measurement cell is changed to flow the electrolyte and a flow potential at each pressure is measured, and then, the surface zeta potential is obtained by the following calculation expression.

Expression 1

$$\zeta = \frac{dI}{dp} \times \frac{\eta}{\varepsilon\varepsilon_0} \frac{L}{A} \quad \text{(Calculation Expression)}$$

[$\zeta$: surface zeta potential, p: pressure, I: flow potential, $\eta$: viscosity of electrolyte, $\varepsilon$: relative dielectric constant of electrolyte, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potentials of each measurement point of pH are obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the magnetic layer measured by the flow potential method is zero, is obtained.

The above measurement is performed three times in total at room temperature by using different samples cut out from the same magnetic tape (magnetic tape which is a measurement target), and pH, in a case where the surface zeta potential of each sample is zero, is obtained. For the viscosity and the relative dielectric constant of the electrolyte, a measurement value at room temperature is used. The room temperature is set as 20° C. to 27° C. An arithmetical mean of three pHs obtained as described above is an isoelectric point of the surface zeta potential of the magnetic layer of the magnetic tape which is a measurement target. In addition, as the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used.

In the invention and the specification, the "oxide abrasive" means a non-magnetic oxide powder having Mohs hardness exceeding 8.

In the invention and the specification, the FIB abrasive diameter is a value obtained by the following method.

(1) Obtaining Secondary Ion Image

A secondary ion image of a region, having a size of 25 µm×25 µm, of the surface of the magnetic layer of the magnetic tape which is a target for obtaining the FIB abrasive diameter is obtained by a focused ion beam device. As the focused ion beam device, MI4050 manufactured by Hitachi High-Technologies Corporation can be used.

Beam irradiation conditions of the focused ion beam device in a case of obtaining the secondary ion image are set so that an acceleration voltage is 30 kV, a current value is 133 pA (picoampere), a beam size is 30 nm, and brightness is 50%. A coating process with respect to a surface of a magnetic layer before the imaging is not performed. A secondary ion (SI) signal is detected by a secondary ion detector and a secondary ion image is captured. Imaging conditions of the secondary ion image are determined by the following method.

In three portions of non-imaging region of the surface of the magnetic layer, a tint of the image is stabilized by performing auto contrast brightness (ACB) (that is, performing the ACB three times), and a contrast reference value and a brightness reference value are determined. A contrast value obtained by decreasing 1% from the contrast reference value determined by the ACB and the brightness reference value are set as the imaging conditions. A non-imaged region of the surface of the magnetic layer is selected and a secondary ion image is captured under the determined imaging conditions. A portion for displaying a size and the like (micron bar, cross mark, and the like) is removed from the captured image, and a secondary ion image having the pixel number of 2,000 pixel×2,000 pixel is obtained. For specific examples of the imaging conditions, examples which will be described later can be referred to.

(2) Calculation of FIB Abrasive Diameter

The secondary ion image obtained in (1) is put into image processing software, and a binarization process is performed by the following procedure. As the image analysis software, Image J which is free software can be used, for example.

A tone of the secondary ion image obtained in (1) is changed to 8 bit. Regarding threshold values for the binarization process, a lower limit value is set as 250 gradations, an upper limit value is set as 255 gradations, and the binarization process is executed by these two threshold values. After the binarization process, a noise component removal process is performed by the image analysis software. The noise component removal process can be performed by the following method, for example. In the image analysis software Image J, Despeckle of a noise cut process is selected, and Size 4.0-Infinity is set by Analyze Particle, to perform the removal of noise components.

Each white-shining portion in the binarization process image obtained as described above is determined as an oxide abrasive, and the number of white-shining portions is obtained by the image analysis software, and the area of the white-shining portion is obtained. An equivalent circle diameter of each portion is obtained from the area of the white-shining portion obtained here. Specifically, an equivalent circle diameter L is calculated from the obtained area A by $(A/\pi)^{\wedge}(1/2) \times 2 = L$.

The above step is performed four times at different portions (25 μm×25 μm) of the surface of the magnetic layer of the magnetic tape which is a target for obtaining the FIB abrasive diameter, and the FIB abrasive diameter is calculated from the obtained results by an expression; FIB abrasive diameter=$\Sigma(Li)/\Sigma i$. $\Sigma i$ is a total number of the white-shining portions observed in the binarization process image obtained by performing the above step four times. $\Sigma(Li)$ is a total of the equivalent circle diameters L obtained regarding the white-shining portions observed in the binarization process image obtained by performing the above step four times. Regarding the white-shining portion, only a part of the portion may be included in the binarization process image. In such a case, $\Sigma i$ and $\Sigma(Li)$ are obtained without including the part.

The inventors have surmised that a reason for that a deterioration in electromagnetic conversion characteristics during the repeated reproducing in a low temperature and high humidity environment can be prevented, even in a case where the total thickness of the non-magnetic layer and the magnetic layer of the magnetic tape is equal to or smaller than 0.60 μm, is as follows.

As described above, it is determined that, in the magnetic tape in which the total thickness of the non-magnetic layer and the magnetic layer is decreased to be equal to or smaller than 0.60 μm, a deterioration in electromagnetic conversion characteristics during the repeated reproducing in a low temperature and high humidity environment easily occurs, compared to a magnetic tape in which a total thickness of a non-magnetic layer and a magnetic layer is greater than 0.60 μm. A reason for that may be a change of a contact state between the surface of the magnetic layer and the head due to a decrease of the total thickness of the non-magnetic layer and the magnetic layer. The inventors have surmised that the partial chipping of the head which easily occurs by the oxide abrasive present on the magnetic layer, due to this change of the contact state may be one reason of the spacing loss.

Meanwhile, the FIB abrasive diameter is a value which can be an index of a presence state of an oxide abrasive in the magnetic layer, and is obtained from the secondary ion image obtained by irradiating the surface of the magnetic layer with a focused ion beam (FIB). This secondary ion image is generated by capturing secondary ion generated from the surface of the magnetic layer irradiated with the FIB. Meanwhile, as an observation method of the presence state of the abrasive in the magnetic layer, a method using a scanning electron microscope (SEM) has been proposed in the related art, as disclosed in a paragraph 0109 of JP2005-243162A, for example. By the SEM, the surface of the magnetic layer is irradiated with an electron beam and secondary electrons emitted from the surface of the magnetic layer are captured to generate an image (SEM image). Even in a case where the same magnetic layer is observed, a size of the oxide abrasive obtained from the secondary ion image and a size of the oxide abrasive obtained from the SEM image are different from each other due to a difference of such image generation principle. As a result of intensive studies of the inventors, a presence state of the oxide abrasive in the magnetic layer is controlled so that the FIB abrasive diameter becomes 0.04 μm to 0.08 μm, by setting the FIB abrasive diameter obtained from the secondary ion image by the method described above as a new index of the presence state of the oxide abrasive in the magnetic layer. The inventors have thought that the controlling of the presence state of the oxide abrasive in the magnetic layer as described above contributes to prevention of a deterioration in electromagnetic conversion characteristics during the repeated reproducing in a low temperature and high humidity environment, in the magnetic tape having the total thickness of the non-magnetic layer and the magnetic layer of equal to or smaller than 0.60 μm. Specifically, the inventors have surmised that, the FIB abrasive diameter of equal to or smaller than 0.08 μm contributes to the prevention of the head chipping, and the FIB abrasive diameter of equal to or greater than 0.04 contributes to applying of head cleaning properties to the surface of the magnetic layer, while preventing the head chipping in a low temperature and high humidity environment.

On the other hand, it is thought that, in the magnetic layer in which the oxide abrasive is present so that the FIB abrasive diameter is 0.04 to 0.08, the head cleaning properties are lower than that of the magnetic layer in which the FIB abrasive diameter is greater than the range described above. Thus, it is surmised that, foreign materials attached to the head are not sufficiently removed, the spacing loss may occur, and the electromagnetic conversion characteristics are deteriorated, even in a case where the head chipping can be prevented, in a case where any measures are not prepared. With respect to this, as a result of intensive studies of the inventors, it is newly found that, in the magnetic tape in which the total thickness of the non-magnetic layer and the magnetic layer is equal to or smaller than 0.60 µm and the magnetic layer in which the oxide abrasive is present so that the FIB abrasive diameter is 0.04 µm to 0.08 µm is provided, a deterioration in electromagnetic conversion characteristics during the repeated reproducing in a low temperature and high humidity environment can be prevented, by setting the isoelectric point of the surface zeta potential of the magnetic layer to be equal to or greater than 5.5. As a reason thereof, the inventors have surmised that, in a magnetic tape in which an isoelectric point of a surface zeta potential of a magnetic layer is equal to or greater than 5.5, that is, in a neutral to basic pH region, foreign materials generated by the chipping are hardly attached to the head, even in a case where the chipping of the surface of the magnetic layer occurs.

As described above, as a result that the spacing loss can be decreased by preventing the head chipping and preventing the attachment of foreign materials to the head, the inventors have surmised that, in the magnetic tape in which the total thickness of the non-magnetic layer and the magnetic layer is decreased to be equal to or smaller than 0.60 µm, a deterioration in electromagnetic conversion characteristics during the repeated reproducing in a low temperature and high humidity environment can be prevented. However, the invention is not limited to the surmise described above.

Hereinafter, the magnetic tape will be described more specifically.

Magnetic Layer

Isoelectric Point of Surface Zeta Potential of Magnetic Layer

A measurement method of the isoelectric point of the surface zeta potential of the magnetic layer is as described above.

The isoelectric point of the surface zeta potential measured by the method described above is an isoelectric point obtained regarding the surface of the magnetic layer. In the magnetic tape in which the total thickness of the non-magnetic layer and the magnetic layer of the magnetic tape is equal to or smaller than 0.60 µm, the isoelectric point of the surface zeta potential of the magnetic layer is equal to or greater than 5.5, preferably equal to or greater than 5.7, and more preferably equal to or greater than 6.0, from a viewpoint of preventing a deterioration in electromagnetic conversion characteristics during the repeated reproducing in a low temperature and high humidity environment. As will be described later in detail, the isoelectric point of the surface zeta potential of the magnetic layer can be controlled by the kind of a component used for forming the magnetic layer, a formation step of the magnetic layer, and the like. From a viewpoint of ease of controlling, the isoelectric point of the surface zeta potential of the magnetic layer is preferably equal to or smaller than 7.0, more preferably equal to or smaller than 6.7, and even more preferably equal to or smaller than 6.5.

FIB Abrasive Diameter

The FIB abrasive diameter obtained from the secondary ion image obtained by irradiating the surface of the magnetic layer of the magnetic tape with the FIB is 0.04 µm to 0.08 µm. In the magnetic tape in which the total thickness of the non-magnetic layer and the magnetic layer of the magnetic tape is equal to or smaller than 0.60 µm, the FIB abrasive diameter is preferably equal to or greater than 0.05 µm and more preferably equal to or greater than 0.06 µm, from a viewpoint of further preventing a deterioration in electromagnetic conversion characteristics during the repeated reproducing in a low temperature and high humidity environment. In addition, from the same viewpoint, the FIB abrasive diameter is preferably equal to or smaller than 0.07 µm. A specific aspect of means for adjusting the FIB abrasive diameter will be described later.

Ferromagnetic Powder

As the ferromagnetic powder included in the magnetic layer, a ferromagnetic powder normally used in the magnetic layer of various magnetic recording media can be used.

It is preferable to use ferromagnetic powder having a small average particle size, from a viewpoint of improvement of recording density of the magnetic tape. From this viewpoint, a ferromagnetic powder having an average particle size equal to or smaller than 50 nm is preferably used, and a ferromagnetic powder having an average particle size equal to or smaller than 40 nm is more preferably used, as the ferromagnetic powder. On the other hand, the average particle size of the ferromagnetic powder is preferably equal to or greater than 5 nm, more preferably equal to or greater than 10 nm, even more preferably equal to or greater than 15 nm, and still more preferably equal to or greater than 20 nm, from a viewpoint of stability of magnetization.

As a preferred specific example of the ferromagnetic powder, a hexagonal ferrite powder can be used. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

As a preferred specific example of the ferromagnetic powder, a metal powder can also be used. For details of the metal powder, descriptions disclosed in paragraphs 0137 to 0141 of JP2011-216149A and paragraphs 0009 to 0023 of JP2005-251351 can be referred to, for example.

As a preferred specific example of the ferromagnetic powder, an ε-iron oxide powder can also be used. As a manufacturing method of the δ-iron oxide powder, a manufacturing method from a goethite, a reverse micelle method, and the like are known. All of the manufacturing methods are well known. Regarding the method of manufacturing the ε-iron oxide powder in which a part of Fe is substituted with substitutional atoms such as Ga, Co, Ti, Al or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred, for example. However, the manufacturing method of the ε-iron oxide powder capable of being used as the ferromagnetic powder in the magnetic layer is not limited.

In the invention and the specification, average particle sizes of various powder such as the ferromagnetic powder and the like are values measured by the following method with a transmission electron microscope, unless otherwise noted. The powder is imaged at a magnification ratio of 100,000 with a transmission electron microscope, the image is printed on photographic printing paper so as to have the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. The ferromagnetic powder, for example, means an aggregate of a plurality of ferromagnetic particles. The aggregate of the plurality of particles is not only limited to an aspect in which particles configuring the aggregate directly come into contact with each other, but also includes an aspect in which a binding agent, an additive, or the like which will be described later is interposed between the particles. A term particle is also used for describing the powder.

As a method of collecting a sample powder from the magnetic tape in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience. In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an acidic group can be used. The acidic group of the invention and the specification is used as a meaning including a state of a group capable of emitting $H^+$ in water or a solvent including water (aqueous solvent) to dissociate anions and salt thereof. Specific examples of the acidic group include a sulfonic acid group, a sulfuric acid group, a carboxy group, a phosphoric acid group, and salt thereof. For example, salt of sulfonic acid group ($—SO_3H$) is represented by $—SO_3M$, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. "eq" indicates equivalent and SI unit is a unit not convertible. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass, with respect to 100.0 parts by mass of the ferromagnetic powder.

In regards to the controlling of the isoelectric point of the surface zeta potential of the magnetic layer, the inventors have surmised that formation of the magnetic layer so that the amount of the acidic component present in the surface portion of the magnetic layer decreases contributes to an increase in value of the isoelectric point. In addition, the inventors have surmised that an increase in amount of the basic component present in the surface portion of the magnetic layer also contributes to an increase in value of the isoelectric point. The acidic component is used as a meaning including a state of a component capable of emitting H in water or an aqueous solvent to dissociate anions and salt thereof. The basic component is used as a meaning including a state of a component capable of emitting $OH^-$ in water or an aqueous solvent to dissociate cations and salt thereof. For example, it is thought that, in a case of using the acidic component, performing a process of unevenly distributing the acidic component in a surface portion of a coating layer of a magnetic layer forming composition first, and then, performing a process of decreasing the amount of acidic component in the surface portion contribute to an increase in value of the isoelectric point of the surface zeta potential of the magnetic layer to control the isoelectric point to be equal to or greater than 5.5. For example, it is thought that, in a step of applying a magnetic layer forming composition onto a non-magnetic support through a non-magnetic layer, the applying which is performed in an alternating magnetic field by applying an alternating magnetic field contributes to uneven distribution of the acidic component in the surface portion of the coating layer of the magnetic layer forming composition. In addition, it is surmised that a burnishing process performed subsequent thereto contributes to removal of at least some acidic component unevenly distributed. The burnishing process is a process of rubbing a surface of a process target with a member (for example, abrasive tape or a grinding tool such as a blade for grinding or a wheel for grinding). A magnetic layer forming step including the burnishing process will be described later in detail. As the acidic component, for example, a binding agent including an acidic group can be used.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Oxide Abrasive

The magnetic tape includes an oxide abrasive in the magnetic layer. The oxide abrasive is a non-magnetic oxide powder having Mohs hardness exceeding 8 and is preferably a non-magnetic oxide powder having Mohs hardness equal to or greater than 9. A maximum value of Mohs hardness is 10. The oxide abrasive may be an inorganic oxide powder and an organic oxide powder, and is preferably an inorganic oxide powder. Specifically, examples of the abrasive include powders of alumina ($Al_2O_3$), titanium oxide ($TiO_2$), cerium oxide ($CeO_2$), and zirconium oxide ($ZrO_2$), and alumina powder is preferable among these. Mohs hardness of alumina is approximately 9. For alumina powder, a description disclosed in a paragraph 0021 of JP2013-229090A can also be referred to. In addition, as an index of a particle size of the oxide abrasive, a specific surface area can be used. It is thought that, as the specific surface area is great, the particle size of the primary particles of the particles configuring the oxide abrasive is small. As the oxide abrasive, an oxide abrasive in which a specific surface area measured by a Brunauer-Emmett-Teller (BET) method (hereinafter, referred to as a "BET specific surface area") is equal to or greater than 14 $m^2/g$, is preferably used. In addition, from a viewpoint of dispersibility, an oxide abrasive having a BET specific surface area equal to or smaller than 40 $m^2/g$ is preferably used. The content of the oxide abrasive in the magnetic layer is preferably 1.0 to 20.0 parts by mass and more preferably 1.0 to 10.0 parts by mass with respect to 100.0 parts by mass of the ferromagnetic powder.

Additives

The magnetic layer includes a ferromagnetic powder, a binding agent, and an oxide abrasive, and may include one or more kinds of additives, if necessary. As the additives, the curing agent described above is used as an example. In addition, examples of the additive included in the magnetic layer include a non-magnetic powder, a lubricant, a dispersing agent, a dispersing assistant, an antibacterial agent, an antistatic agent, and an antioxidant, in addition to the oxide abrasive. As the additives, a commercially available product can be suitably selected or any amount of a material can be manufactured by a well-known method and used according to the desired properties. For example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

In addition, as the dispersing agent, a dispersing agent for increasing dispersibility of the oxide abrasive can be used. As a compound which can function as such a dispersing agent, an aromatic hydrocarbon compound including a phenolic hydroxyl group can be used. The "phenolic hydroxyl group" is a hydroxyl group directly bonded to an aromatic ring. The aromatic ring included in the aromatic hydrocarbon compound may be a monocycle, may have a polycyclic structure, or may be a condensed ring. From a viewpoint of improving dispersibility of the oxide abrasive, an aromatic hydrocarbon compound including a benzene ring or a naphthalene ring is preferable. In addition, the aromatic hydrocarbon compound may include a substituent other than the phenolic hydroxyl group. Examples of the substituent other than the phenolic hydroxyl group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxyl groups included in one molecule of the aromatic hydrocarbon compound may be one, two, three, or greater.

As a preferable aspect of the aromatic hydrocarbon compound including the phenolic hydroxyl group, a compound represented by General Formula 100 can be used.

[Chem. 1]

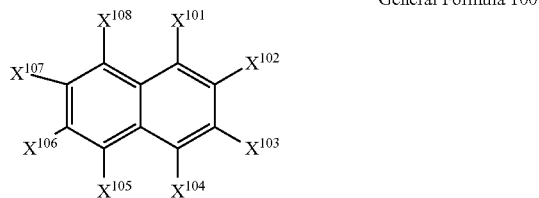

General Formula 100

[In General Formula 100, two of $X^{101}$ to $X^{108}$ are hydroxyl groups and the other six thereof each independently represent a hydrogen atom or a substituent.]

In the compound represented by General Formula 100, substituent positions of the two hydroxyl groups (phenolic hydroxyl groups) are not particularly limited.

In the compound represented by General Formula 100, two of $X^{101}$ to $X^{108}$ are hydroxyl groups (phenolic hydroxyl groups) and the other six thereof each independently represent a hydrogen atom or a substituent. In addition, among $X^{101}$ to $X^{108}$, all of the part other than the two hydroxyl groups may be a hydrogen atom or a part or all thereof may be a substituent. As the substituent, the substituent described above can be used. As the substituent other than the two hydroxyl groups, one or more phenolic hydroxyl groups may be included. From a viewpoint of improving dispersibility of the oxide abrasive, it is preferable that the substituent other than the two hydroxyl groups of $X^{101}$ to $X^{108}$ is not a phenolic hydroxyl group. That is, the compound represented by General Formula 100 is preferably dihydroxynaphthalene or a derivative thereof, and more preferably 2,3-dihydroxynaphthalene or a derivative thereof. Examples of the preferable substituent represented by $X^{101}$ to $X^{108}$ include a halogen atom (for example, a chlorine atom or a bromine atom), an amino group, an alkyl group having 1 to 6 (preferably 1 to 4) carbon atoms, a methoxy group, an ethoxy group, an acyl group, a nitro group, a nitroso group, and a —CH$_2$OH group.

In addition, for the dispersing agent for increasing dispersibility of the oxide abrasive, a description disclosed in paragraphs 0024 to 0028 of JP2014-179149A can be referred to.

The used amount of the dispersing agent for increasing dispersibility of the oxide abrasive can be, for example, 0.5 to 20.0 parts by mass and is preferably 1.0 to 10.0 parts by mass with respect to 100.0 parts by mass of the abrasive, in a case of preparing a magnetic layer forming composition (preferably, in a case of preparing an abrasive solution as will be described later).

As the non-magnetic powder other than the oxide abrasive included in the magnetic layer, a non-magnetic powder which can contribute to formation of projections on the surface of the magnetic layer to control of friction properties (hereinafter, also referred to as a "projection formation agent"). As the projection formation agent, various non-magnetic powders normally used as a projection formation agent on a magnetic layer can be used. These may be a powder of an inorganic substance (inorganic powder) or a powder of an organic substance (organic powder). In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably an inorganic powder. Examples of the inorganic powder include a powder of metal oxide, metal carbonate, metal sulfate, metal nitride, metal carbide, and metal sulfide. Particles configuring the projection formation agent are preferably colloidal particles more preferably inorganic oxide colloidal particles. In addition, from a viewpoint of availability of monodisperse particles, the inorganic oxide configuring the inorganic oxide colloidal particles is preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at any mixing ratio. In another aspect, the projection formation agent is preferably carbon black. An average particle size of the projection formation agent can be, for example, 30 to 300 nm and is preferably 40 to 200 nm. In addition, from a viewpoint that the projection formation can exhibit each function in more excellent manner, the content of the projection formation agent in the magnetic layer is preferably 1.0 to 4.0 parts by mass and more preferably 1.5 to 3.5 parts by mass with respect to 100.0 parts by mass of the ferromagnetic powder.

The magnetic layer described above is provided on the surface of the non-magnetic support through the non-magnetic layer.

Non-Magnetic Layer

Next, the non-magnetic layer will be described. The magnetic tape may include a non-magnetic layer on a surface of a non-magnetic support and includes a magnetic layer on the non-magnetic layer. The non-magnetic layer includes at least a non0mgn powder and a binding agent. The non-magnetic powder used in the non-magnetic layer may be an inorganic powder or an organic powder. In addition, carbon black and the like can be used. Examples of the inorganic powder include a powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support (hereinafter, also referred to as a "support") will be described. As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape may or may not include a back coating layer including non-magnetic powder and a binding agent on a surface of the non-magnetic support opposite to the surface provided with the magnetic layer. The back coating layer preferably includes any one or both of carbon black and inorganic powder. In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

The total thickness of the non-magnetic layer and the magnetic layer of the magnetic tape is equal to or smaller than 0.60 µm and preferably equal to or smaller than 0.50 µm, from a viewpoint of thinning of the magnetic tape. The total thickness of the non-magnetic layer and the magnetic layer can be, for example, equal to or greater than 0.10 µm, equal to or greater than 0.15 µm, or equal to or greater than 0.20 µm.

The thickness of the non-magnetic support of the magnetic tape is preferably 3.00 to 5.50 µm.

A thickness of the magnetic layer can be optimized according to a saturation magnetization of a magnetic head used, a head gap length, a recording signal band, and the like. The thickness of the magnetic layer is normally 0.01 µm to 0.15 µm, and is preferably 0.02 µm to 0.12 µm and more preferably 0.03 µm to 0.10 µm, from a viewpoint of realization of high-density recording. The magnetic layer may be at least one layer, or the magnetic layer can be separated into two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.10 to 0.55 µm and preferably 0.10 to 0.50 µm.

A thickness of the back coating layer is preferably equal to or smaller than 0.90 µm and more preferably 0.10 to 0.70 µm.

The total thickness of the magnetic tape is preferably equal to or smaller than 7.000 µm, more preferably equal to or smaller than 6.00 µm, and even more preferably equal to or smaller than 5.50 µm, from a viewpoint of improving recording capacity per one reel of the magnetic tape cartridge. Meanwhile, the total thickness of the magnetic tape is preferably equal to or greater than 3.00 µm, from a viewpoint of ease of handling (handleability) of the magnetic tape.

The thicknesses of various layers and the non-magnetic support of the magnetic tape can be obtained by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one random portion of the cross section, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. In any stage of preparing each layer forming composition, the filtering may be performed by a well-known method. The filtering can be performed by using a filter, for example. As the filter used in the filtering, a filter having a hole diameter of 0.01 to 3 µm (for example, filter made of glass fiber or filter made of polypropylene) can be used, for example.

The value of the FIB abrasive diameter tends to decrease, as the oxide abrasive is present in a finer state in the magnetic layer. As means for causing the oxide abrasive to be present in a finer state in the magnetic layer, a dispersing agent capable of increasing dispersibility of the oxide abrasive can be used, as described above. In addition, in order to cause the oxide abrasive to be present in a finer state in the magnetic layer, it is preferable that an abrasive having a small particle size is used, aggregation of the oxide abrasive is prevented, and uneven distribution is prevented to disperse the oxide abrasive in the magnetic layer evenly. As means for this, a method of reinforcing dispersion conditions of the oxide abrasive in a case of preparing the magnetic layer forming composition is used. For example, dispersing the oxide abrasive separately from the ferromagnetic powder is one aspect of the reinforcement of the dispersion conditions. The separate dispersion is specifically a method of preparing a magnetic layer forming composition through a step of mixing an abrasive solution including an oxide abrasive and a solvent (here, ferromagnetic powder is not substantially included) with a magnetic liquid including the ferromagnetic powder, a solvent, and a binding agent. By performing the mixing after dispersing the oxide abrasive separately from the ferromagnetic powder, it is possible to increase dispersibility of the oxide abrasive in the magnetic layer forming composition. The expression "ferromagnetic powder is not substantially included" means that the ferromagnetic powder is not added as a constituent element of the abrasive solution, and a small amount of the ferromagnetic powder mixed as impurities without any intention is allowed. In addition to the separate dispersion or with the separate dispersion, means such as the dispersion process performed for a long period of time, the use of dispersion medium having a small size (for example, a decrease in diameter of dispersion beads in the beads dispersion), a high degree of filling of the dispersion medium in the disperser can be randomly combined to reinforce the dispersion conditions. For the disperser and the dispersion medium, a commercially available product can be used. In addition, a centrifugal separation process of the abrasive solution contributes to the oxide abrasive present in the magnetic layer in a finer state, by removing particles having a size greater than an average particle size and/or aggregated particles from the particles configuring the oxide abrasive. The centrifugal separation process can be performed by a commercially available centrifugal separator. In addition, the filtering of the abrasive solution performed by using a filter or the like is preferable for removing a coarse aggregate of the aggregated particles configuring the oxide abrasive. The removal of such coarse aggregate can contribute to the oxide abrasive present in the magnetic layer in a finer state. For example, the filtering by using a filter having a smaller hole diameter can contribute to the oxide abrasive present in the magnetic layer in a finer state. In addition, by adjusting various process conditions (for example, stirring conditions, dispersion process conditions, filtering conditions, and the like) after mixing the abrasive solution with the component for preparing the magnetic layer forming composition such as the ferromagnetic powder or the like, it is possible to increase dispersibility of the oxide abrasive in the magnetic layer forming composition. This can also contribute to the oxide abrasive present in the magnetic layer in a finer state. However, in a case where the oxide abrasive is present in the magnetic layer in an extremely finer state, the FIB abrasive diameter may be smaller than 0.04 µm, and therefore, it is preferable that various conditions for preparing the abrasive solution are adjusted so as to realize the FIB abrasive diameter of 0.04 µm to 0.08 µm.

The magnetic layer can be formed by performing multilayer coating of the magnetic layer forming composition with the non-magnetic layer forming composition in order or at the same time and then drying. For details of the coating for forming each layer, a description disclosed in a paragraph 0066 of JP2010-231843A can be referred to. In addition, the coating of the magnetic layer forming composition performed in an alternating magnetic field can contribute to the controlling of the isoelectric point of a surface zeta potential of the magnetic layer to be equal to or greater than 5.5. The inventors have surmised that this is because, an acidic component (for example, the binding agent including an acidic group) is easily unevenly distributed to a surface portion of a coating layer of the magnetic layer forming composition due to the applied alternating magnetic field, and thus, by drying this coating layer, a magnetic layer in which the acidic component is unevenly distributed to the surface portion is obtained. In addition, the inventors have surmised that the burnishing process performed subsequent thereto contributes to removal of at least some acidic component unevenly distributed to control the isoelectric point of a surface zeta potential of the magnetic layer to be equal to or greater than 5.5. However, this is merely a surmise. The applying of the alternating magnetic field can be performed by disposing a magnet in a coating device so that the alternating magnetic field is applied vertically to the surface of the coating layer of the magnetic layer forming composition. A magnetic field strength of the alternating magnetic field can be, for example, set as approximately 0.05 to 3.00 T. However, there is no limitation to this range. The "vertical" in the invention and the specification does not mean only a vertical direction in the strict sense, but also includes a range of errors allowed in the technical field of the invention. For example, the range of errors means a range of less than +10° from an exact vertical direction.

The burnishing process is a process of rubbing a surface of a process target with a member (for example, abrasive tape or a grinding tool such as a blade for grinding or a wheel for grinding) and can be performed in the same manner as a well-known burnishing process for manufacturing a coating type magnetic recording medium. The burnishing process can be preferably performed by performing one or both of rubbing (polishing) of a surface of a process target with an abrasive tape, and rubbing (grinding) of a surface of a process target with a grinding tool. As the abrasive tape, a commercially available product may be used or an abrasive tape manufactured by a well-known method may be used. In addition, as the grinding tool, a well-known blade for grinding such as a fixed type blade, a diamond wheel, or a rotary blade, or a wheel for grinding can be used. Further, a wiping process of wiping the surface rubbed with the abrasive tape and/or the grinding tool with a wiping material may be performed. For details of the preferable abrasive tape, grinding tool, burnishing process, and wiping process, paragraphs 0034 to 0048, FIG. 1, and examples of JP1994-052544A (JP-H06-52544A) can be referred to. It is thought that, as the burnishing process is reinforced, it is possible remove a large amount of the acidic component unevenly distributed to the surface portion of the coating layer of the magnetic layer forming composition by performing the applying in the alternating magnetic field. As an abrasive having high hardness is used as an abrasive included in the abrasive tape, the burnishing process can be reinforced, and as the amount of the abrasive in the abrasive tape increases, the burnishing process can be reinforced. In addition, as a grinding tool having high hardness is used as the grinding tool, the burnishing process can be reinforced. In regards to burnishing process conditions, as a sliding speed of the surface of the process target and the member (for example, the abrasive tape or the grinding tool) increases, the burnishing process can be reinforced. The sliding speed can be increased by increasing one or both of a speed of movement of the member and a speed of movement of the magnetic tape of the process target. Although the reason is not clear, as the amount of the binding agent including the acidic group in the coating layer of the magnetic layer forming composition is great, the isoelectric point of a surface zeta potential of the magnetic layer tends to increase after the burnishing process.

In a case where the magnetic layer forming composition includes a curing agent, a curing process is preferably performed in any stage of the step for forming the magnetic layer. The burnishing process is preferably performed at least before the curing process. After the curing process, the burnishing process may be further performed. The inventors have thought that it is preferable to perform the burnishing process before the curing process, in order to increase removal efficiency for removing the acidic component from the surface portion of the coating layer of the magnetic layer forming composition. The curing process can be performed by a process of a heat treatment or light irradiation, according to the kind of the curing agent included in the magnetic layer forming composition. The curing process conditions are not particularly limited and may be suitably set according to the list of the magnetic layer forming composition, the kind of the curing agent, the thickness of the coating layer, and the like. For example, in a case where the coating layer is formed by using the magnetic layer forming composition including polyisocyanate as the curing agent, the curing process is preferably a heat treatment. In a case where the curing agent is included in a layer other than the coating layer of the magnetic layer forming composition, the curing process can proceed with the curing reaction of the layer. Alternatively, the curing process can also be performed separately.

The surface smoothing treatment can be preferably performed before the curing process. The surface smoothing treatment is a process performed for increasing smoothness of the surface of the magnetic layer and/or the surface of the back coating layer and is preferably performed by a calender process. For details of the calender process, description disclosed in a paragraph 0026 of JP2010-231843A can be referred to, for example.

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process, while the coating layer is wet (not dried). For the alignment process, various well-known technologies such as descriptions disclosed in a paragraph 0067 of JP2010-231843A can be used. For example, the homeotropic alignment process can be performed by a well-known method such as a method using a pole opposing magnet. In the alignment zone, a drying speed of the coating layer can be controlled depending on a temperature and an air flow of dry air and/or a transportation speed of the magnetic tape in the alignment zone. In addition, the coating layer may be preliminarily dried before the transportation to the alignment zone. In a case of performing the alignment process, it is preferable to apply a magnetic field (for example, DC magnetic field) for aligning the ferromagnetic powder with respect to the coating layer of the magnetic layer forming composition applied in the alternating magnetic field.

As described above, it is possible to obtain the magnetic tape according to one aspect of the invention. The magnetic tape is normally accommodated in a magnetic tape cartridge and the magnetic tape cartridge is mounted on a magnetic tape apparatus. A servo pattern can also be formed in the magnetic layer of the magnetic tape by a well-known method, in order to allow head tracking servo to be performed in the magnetic tape apparatus.

In the magnetic tape, it is possible to prevent a deterioration in electromagnetic conversion characteristics during the repeated reproducing in a low temperature and high humidity environment, although the total thickness of the non-magnetic layer and the magnetic layer is equal to or smaller than 0.60 μm. In one aspect, the low temperature and high humidity environment can be, for example, an environment in which an atmosphere temperature is 10° C. to 20° C. and a relative humidity is 70% to 90%.

Magnetic Tape Cartridge

One aspect of the invention relates to a magnetic tape cartridge including the magnetic tape.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape apparatus (drive) in order to record and/or reproduce information (magnetic signals) on the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of information is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to one aspect of the invention, and a well-known technology can be applied for other configurations.

Magnetic Tape Apparatus

One aspect of the invention relates to a magnetic tape apparatus including the magnetic tape and a magnetic head.

In the invention and the specification, the "magnetic tape apparatus" means a device capable of performing at least one of the recording of information on the magnetic tape or the reproducing of information recorded on the magnetic tape. Such an apparatus is generally called a drive. The magnetic tape apparatus can be a sliding type magnetic tape apparatus. The sliding type apparatus is an apparatus in which the surface of the magnetic layer comes into contact with and slides on the magnetic head, in a case of performing the recording of information on the magnetic tape and/or reproducing of the recorded information.

The magnetic head included in the magnetic tape apparatus can be a recording head capable of performing the recording of information on the magnetic tape, or can be a reproducing head capable of performing the reproducing of information recorded on the magnetic tape. In addition, In one embodiment, the magnetic tape apparatus can include both of a recording head and a reproducing head as separate magnetic heads. In another aspect, the magnetic head included in the magnetic tape can also have a configuration of comprising both of a recording element and a reproducing element in one magnetic head. As the reproducing head, a magnetic head (MR head) including a magnetoresistive (MR) element capable of sensitively reading information recorded on the magnetic tape as a reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic tape apparatus.

In the magnetic tape apparatus, the recording of information on the magnetic tape and/or the reproducing of information recorded on the magnetic tape can be performed by bringing the surface of the magnetic layer of the magnetic tape into contact with the magnetic head and sliding. The magnetic tape apparatus may include the magnetic tape according to one aspect of the invention and well-known technologies can be applied for other configurations.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

A "binding agent A" described below is a $SO_3Na$ group-containing polyurethane resin (weight-average molecular weight: 70,000, $SO_3Na$ group: 0.20 meq/g).

A "binding agent B" described below is a vinyl chloride copolymer (product name: MR110, $SO_3K$ group-containing vinyl chloride copolymer, $SO_3K$ group: 0.07 meq/g) manufactured by Kaneka Corporation.

Manufacturing of Magnetic Tape

Example 1

(1) Preparation of Alumina Dispersion

The amount of 2,3-dihydroxynaphthalene (manufactured by Tokyo Chemical Industry Co., Ltd.) shown in Table 1, 31.3 parts of a 32% solution (solvent is a mixed solvent of methyl ethyl ketone and toluene) of a polyester polyurethane resin including a $SO_3Na$ group as a polar group (UR-4800 (polar group amount: 80 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of oxide abrasive (alumina powder) shown in Table 1, and dispersed in the presence of zirconia beads (bead diameter: 0.1 mm) by a paint shaker for a period of time shown in Table 1 (bead dispersion time). After the dispersion, the centrifugal separation process of a dispersion liquid obtained by separating the dispersion liquid from the beads by mesh was performed. The centrifugal separation process was performed by using CS150GXL manufactured by Hitachi, Ltd. (rotor used is S100AT6 manufactured by Hitachi, Ltd.) as a centrifugal separator at a rotation per minute (rpm) shown in Table 1 for a period of time (centrifugal separation time) shown in Table 1. After that, the filtering was performed by using a filter having a hole diameter shown in Table 1, and an alumina dispersion (abrasive solution) was obtained.

(2) Magnetic Layer Forming Composition List

Magnetic Liquid

| | |
|---|---|
| Ferromagnetic powder: | 100.0 parts |
| Hexagonal barium ferrite powder having | |
| average particle size (average plate diameter) of 21 nm | |
| Binding agent A and/or binding agent B (see Table 1): | see Table 1 |
| Cyclohexanone: | 150.0 parts |
| Methyl ethyl ketone: | 150.0 parts |

Abrasive Solution

| | |
|---|---|
| Alumina dispersion prepared in the section (1): | 6.0 parts |

Silica Sol (projection formation agent liquid)

| | |
|---|---|
| Colloidal silica (Average particle size: 120 nm) | 2.0 parts |
| Methyl ethyl ketone: | 1.4 parts |

Other Components

| | |
|---|---|
| Stearic acid: | 2.0 parts |
| Stearic acid amide: | 0.2 parts |
| Butyl stearate: | 2.0 parts |
| Polyisocyanate (CORONATE (registered trademark) manufactured by Tosoh Corporation): | 2.5 parts |

Finishing Additive Solvent

| | |
|---|---|
| Cyclohexanone: | 200.0 parts |
| Methyl ethyl ketone: | 200.0 parts |

(3) Non-Magnetic Layer Forming Composition List

| | |
|---|---|
| Non-magnetic inorganic powder: α-iron oxide | 100.0 parts |
| Average particle size (average long axis length): 0.15 μm | |
| Average acicular ratio: 7 | |
| BET specific surface area: 52 $m^2/g$ | |
| Carbon black | 20.0 parts |
| Average particle size: 20 nm | |
| Abrasive A: | 18.0 parts |
| Stearic acid: | 2.0 parts |
| Stearic acid amide: | 0.2 parts |
| Butyl stearate: | 2.0 parts |
| Cyclohexanone: | 300.0 parts |
| Methyl ethyl ketone: | 300.0 parts |

(4) Back Coating Layer Forming Composition List

| | |
|---|---|
| Non-magnetic inorganic powder: α-iron oxide | 80.0 parts |
| Average particle size (average long axis length): 0.15 μm | |
| Average acicular ratio: 7 | |
| BET specific surface area: 52 $m^2/g$ | |
| Carbon black | 20.0 parts |
| Average particle size: 20 nm | |
| A vinyl chloride copolymer | 13.0 parts |
| A sulfonic acid salt group-containing polyurethane resin | 6.0 parts |
| Phenylphosphonic acid | 3.0 parts |
| Methyl ethyl ketone | 155.0 parts |
| Polyisocyanate | 5.0 parts |
| Cyclohexanone | 355.0 parts |

(5) Preparation of Each Layer Forming Composition

The magnetic layer forming composition was prepared by the following method.

The magnetic liquid was prepared by dispersing (beads-dispersing) various components of the magnetic liquid by using a batch type vertical sand mill for 24 hours. Zirconia beads having a bead diameter of 0.5 mm were used as the dispersion beads.

The prepared magnetic liquid, the abrasive solution, silica sol, the other components, and the finishing additive solvent were introduced to a dissolver stirrer, and stirred at a circumferential speed of 10 m/sec for a period of time shown in Table 1. After that, After that, a ultrasonic dispersion process was performed at a flow rate of 7.5 kg/min with a flow type ultrasonic disperser for a period of time shown in Table 1 (ultrasonic dispersion time), and filtering with a filter having a hole diameter shown in Table 1 was performed for the number of times shown in Table 1, thereby preparing the magnetic layer forming composition.

The non-magnetic layer forming composition was prepared by the following method.

Each component excluding the lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver stirrer. The dispersion liquid obtained as described above was filtered with a filter having a hole diameter of 0.5 μm and a non-magnetic layer forming composition was prepared.

The back coating layer forming composition was prepared by the following method.

Each component excluding polyisocyanate and cyclohexanone was kneaded by an open kneader and diluted, and was subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver stirrer. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness of 5.00 μm so that the thickness after the drying becomes a thickness shown in Table 1 and was dried to form a non-magnetic layer.

Then, in a coating device disposed with a magnet for applying an alternating magnetic field, the magnetic layer forming composition prepared in the section (5) was applied onto the surface of the non-magnetic layer so that the thickness after the drying becomes a thickness shown in Table 1, while applying an alternating magnetic field (magnetic field strength: 0.15 T), to form a coating layer. The applying of the alternating magnetic field was performed so that the alternating magnetic field was applied vertically to the surface of the coating layer. After that, a homeotropic alignment process was performed by applying a magnetic field having a magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes 0.50 μm, and was dried to form a back coating layer.

The magnetic tape obtained as described above was slit to have a width of ½ inches (0.0127 meters), and the burnishing process and the wiping process of the surface of the coating layer were performed. The burnishing process and the wiping process were performed in a process device having a configuration shown in FIG. 1 of JP-H06-52544A, by using a commercially available abrasive tape (product name: MA22000 manufactured by Fujifilm Holdings Corporation, abrasive: diamond/$Cr_2O_3$/red oxide) as an abrasive tape, by using a commercially available sapphire diamond (manufactured by Kyocera Corporation, width of 5 mm, length of 35 mm, an angle of a distal end of 60 degrees) as a blade for grinding, and by using a commercially available wiping material (product name: WRP736 manufactured by Kuraray Co., Ltd.) as a wiping material. For the process conditions, process conditions of Example 12 of JP-H06-52544A were used.

After the burnishing process and the wiping process, a calender process (surface smoothing treatment) was performed by using a calender roll configured of only a metal roll, at a speed of 80 m/min, linear pressure of 300 kg/cm (294 kN/m), and a calender temperature (surface temperature of a calender roll) of 100° C.

Then, the heat treatment (curing process) was performed in the environment of the atmosphere temperature of 70° C. for 36 hours. After that, a servo pattern was formed on the magnetic layer by a commercially available servo writer.

By doing so, a magnetic tape of Example 1 was manufactured.

Examples 2 to 6, Comparative Examples 1 to 7, and Reference Examples 1 and 2

A magnetic tape was manufactured by the same method as in Example, except that various conditions were changed as shown in Table 1.

In Table 1, in Examples 2 to 6 and Comparative Examples 3 and 5 in which "performed" is shown in the column of the alternating magnetic field application during coating and the column of the burnishing process, the step subsequent to the coating step of the magnetic layer forming composition was performed by the same method as in Example 1. That is, the application of the alternating magnetic field was performed during coating of the magnetic layer forming composition in the same manner as in Example 1, and the burnishing process and the wiping process were performed with respect to the magnetic layer.

With respect to this, in Comparative Example 7 in which "not performed" is shown in the column of the burnishing process, the step subsequent to the coating step of the magnetic layer forming composition was performed by the same method as in Example 1, except that the burnishing process and the wiping process were not performed with respect to the magnetic layer.

In Comparative Example 6 in which "not performed" is shown in the column of the alternating magnetic field application during coating, the step subsequent to the coating step of the magnetic layer forming composition was performed by the same method as in Example 1, except that the application of the alternating magnetic field was not performed.

In Comparative Examples 1, 2, and 4 and Reference Examples 1 and 2 in which "not performed" is shown in the column of the alternating magnetic field application during coating and the column of the burnishing process, the step subsequent to the coating step of the magnetic layer forming composition was performed by the same method as in Example 1, except that application of the alternating magnetic field is not performed and the burnishing process and the wiping process were not performed with respect to the magnetic layer.

The thickness of each layer and the thickness of the non-magnetic support of each magnetic tape of the examples, the comparative examples, and the reference examples were acquired by the following method, and it was confirmed that the thicknesses of the non-magnetic layer and the thickness of the magnetic layer were the thicknesses shown in Table 1 and the thickness of the back coating layer and the non-magnetic support is the thickness described above.

A cross section of the magnetic tape in a thickness direction was exposed to ion beams and the exposed cross section was observed with a scanning electron microscope.

Various thicknesses were obtained as an arithmetical mean of thicknesses obtained at two portions, randomly extracted from the cross section observation.

Evaluation of Physical Properties of Magnetic Tape (1) Isoelectric Point of Surface Zeta Potential of Magnetic Layer Six samples for isoelectric point measurement were cut out from each magnetic tape of the examples, the comparative examples, and the reference examples and disposed in the measurement cell of two samples in one measurement. In the measurement cell, a sample installing surface and a surface of the back coating layer of the sample were bonded to each other by using a double-sided tape in upper and lower sample table (size of each sample installing surface is 1 cm×2 cm) of the measurement cell. Accordingly, in a case where an electrolyte flows in the measurement cell, the surface of the magnetic layer of the sample comes into contact with the electrolyte, and thus, the surface zeta potential of the magnetic layer can be measured. The measurement was performed three times in total by using two samples in each measurement, and the isoelectric points of the surface zeta potential of the magnetic layer were obtained. An arithmetical mean of the obtained three values was shown in Table 1, as the isoelectric point of the surface zeta potential of the magnetic layer of each magnetic tape. As a surface zeta potential measurement device, SurPASS manufactured by Anton Paar was used. The measurement conditions were set as follows. Other details of the method of obtaining the isoelectric point are as described above.

Measurement cell: variable gap cell (20 mm×10 mm)

Measurement mode: Streaming Current

Gap: approximately 200 μm

Measurement temperature: room temperature

Ramp Target Pressure/Time: 400,000 Pa (400 mbar)/60 seconds

Electrolyte: KCl aqueous solution having concentration of 1 mmol/L (adjusted pH to 9)

pH adjusting solution: HCl aqueous solution having concentration of 0.1 mol/L or KOH aqueous solution having concentration of 0.1 mol/L Measurement pH: pH 9→pH 3 (measured at 13 measurement points in total at interval of approximately 0.5)

(2) FIB Abrasive Diameter

The FIB abrasive diameter of each magnetic tape of the examples, the comparative examples, and the reference examples was obtained by the following method. As a focused ion beam device, MI4050 manufactured by Hitachi High-Technologies Corporation was used, and the image analysis software, Image J which is free software was used.

(i) Acquiring of Secondary Ion Image

The surface of the back coating layer of the sample for measurement cut out from each magnetic tape was bonded to an adhesive layer of a commercially available carbon double-sided tape for SEM measurement (double-sided tape in which a carbon film is formed on a base material formed of aluminum). An adhesive layer of this double-sided tape on a surface opposite to the surface bonded to the surface of the back coating layer was bonded to a sample table of the focused ion beam device. By doing so, the sample for measurement was disposed on the sample table of the focused ion beam device so that the surface of the magnetic layer faces upwards.

Without performing the coating process before the imaging, the beam setting of the focused ion beam device was set so that an acceleration voltage is 30 kV, a current value is 133 pA, a beam size is 30 nm, and brightness is 50%, and an SI signal was detected by a secondary ion detector. In three portions of non-imaging region of the surface of the magnetic layer, a tint of the image was stabilized by performing the ACB, and a contrast reference value and a brightness reference value were determined. A contrast value obtained by decreasing 1% from the contrast reference value determined by the ACB and the brightness reference value were determined as the imaging conditions. A non-imaged region of the surface of the magnetic layer was selected, and the imaging was performed under the imaging conditions determined as described above at pixel distance=25.0 (nm/pixel). As an image capturing method, PhotoScan Dotx4_Dwell Time 15 μsec (capturing time: 1 min), and a capturing size was set as 25 μm×25 μm. By doing so, a secondary ion image of a region of the surface of the magnetic layer having a size of 25 μm×25 μm was obtained. After the scanning, the obtained secondary ion image was stored as a file format, JPEG, by ExportImage, by clicking mouse right button on the captured screen. The pixel number of the image which was 2,000 pixel×2,100 pixel was confirmed, the cross mark and the micron bar on the captured image were deleted, and an image of 2,000 pixel×2,000 pixel was obtained.

(ii) Calculation of FIB Abrasive Diameter

The image data of the secondary ion image obtained in (i) was dragged and dropped in Image J which is the image analysis software.

A tone of the image data was changed to 8 bit by using the image analysis software. Specifically, Image of the operation menu of the image analysis software was clicked and 8 bit of Type was selected.

For the binarization process, 250 gradations was selected as a lower limit value, 255 gradations was selected as an upper limit value, and the binarization process was executed by these two threshold values. Specifically, on the operation menu of the image analysis software, Image was clicked, Threshold of Adjust was selected, the lower limit value was selected as 250, the upper limit value was selected as 255, and then, apply was selected. Regarding the obtained image, Process of the operation menu of the image analysis software was clicked, and Despeckle of Noise was selected, and Size 4.0-Infinity was set by Analyze Particle, to perform the removal of noise components.

Regarding the binarization process image obtained as described above, Analyze particle was selected from the operation menu of the image analysis software, and the number and Area (unit: Pixel) of white-shining portions on the image were obtained. The area of each white-shining portion on the image was obtained by converting Area (unit: Pixel) into the area by the image analysis software. Specifically, 1 pixel of the image obtained under the imaging conditions corresponded to 0.0125 μm, and accordingly, the area A [μm$^2$] was calculated by an expression, area A=Area pixel×0.0125^2. By using the area calculated as described above, an equivalent circle diameter L of each white-shining portion was obtained by an expression, equivalent circle diameter L=(A/π)^(½)×2=L.

The above step was performed four times at different portions (25 μm×25 μm) of the surface of the magnetic layer of the sample for measurement, and the FIB abrasive diameter was calculated from the obtained result by an expression, FIB abrasive diameter=Σ(Li)/Σi.

Change of Electromagnetic Conversion Characteristics (Signal-to-Noise-Ratio (SNR)) after Repeated Reproducing in Low Temperature and High Humidity Environment (SNR Decrease Amount)

The electromagnetic conversion characteristics (SNR) were measured with a reel tester having a width of ½ inches (0.0127 meters) to which a head was fixed, by the following method.

The recording was performed by setting a head/tape relative speed as 5.5 m/sec, using a metal-in-gap (MIG) head (gap length of 0.15 μm, track width of 1.0 μm), and setting a recording current as an optimal recording current of each magnetic tape.

As a reproducing head, a giant-magnetoresistive (GMR) head having an element thickness of 15 nm, a shield interval of 0.1 μm, and a lead width of 0.5 μm was used. A signal was recorded at linear recording density (270 kfci) and a reproducing signal was measured with a spectrum analyzer manufactured by Shibasoku Co., Ltd. The unit kfci is a unit of linear recording density (not convertible into the unit SI). As the signal, a sufficiently stabilized portion of the signal after starting the running of the magnetic tape was used. A ratio of an output value of a carrier signal and integral noise over whole spectral range was set as an SNR.

Under the conditions described above, the reproduction (head/tape relative speed: 8.0 m/sec) was performed by reciprocating 8,000 passes in an environment of an atmosphere temperature of 13° C. and relative humidity of 80%, by setting a tape length per 1 pass as 1,000 m, and the SNR was measured. A distance between the SNR of the first pass and the SNR of the 8,000th pass (SNR of the 8,000th pass—SNR of the first pass) was obtained. In a case where the distance is less than −2.0 dB, it can be determined that it is a magnetic tape showing excellent electromagnetic conversion characteristics desired for the data back-up tape.

The results described above are shown in Table 1 (Table 1-1 to Table 1-2).

TABLE 1

| | | Example 1 | Example 2 | Example 3 | Example 4 | Example 5 | Example 6 |
|---|---|---|---|---|---|---|---|
| Magnetic layer thickness | | 0.10 μm | 0.10 μm | 0.10 μm | 0.10 μm | 0.10 μm | 0.10 μm |
| Non-magnetic layer thickness | | 0.50 μm | 0.50 μm | 0.50 μm | 0.30 μm | 0.10 μm | 0.10 μm |
| Total thickness of non-magnetic layer and magnetic layer | | 0.60 μm | 0.60 μm | 0.60 μm | 0.40 μm | 0.20 μm | 0.20 μm |
| Preparation of magnetic layer | Oxide abrasive product name (manufactured by Sumitomo Chemical Co., Ltd.) | Hit70 | Hit70 | Hit70 | Hit80 | Hit80 | Hit70 |
| | Oxide abrasive BET specific surface area (m²/g) | 20 | 20 | 20 | 30 | 30 | 20 |
| | Content of abrasive solution dispersing agent (2,3-dihydroxynaphthalene) | 3.0 parts | 3.0 parts | 3.0 parts | 3.0 parts | 3.0 parts | 3.0 parts |
| | Beads dispersion time | 60 minutes | 60 minutes | 60 minutes | 180 minutes | 180 minutes | 60 minutes |
| | Centrifugal separation Rotation rate | 5500 rpm | 5500 rpm | 5500 rpm | 3500 rpm | 3500 rpm | 5500 rpm |
| | Centrifugal separation time | 3.8 minutes | 3.8 minutes | 3.8 minutes | 3.8 minutes | 3.8 minutes | 3.8 minutes |
| | Filter hole diameter | 0.3 μm | 0.3 μm | 0.3 μm | 0.3 μm | 0.3 μm | 0.3 μm |
| Preparation of magnetic layer forming composition | Stirring time | 180 minutes | 180 minutes | 180 minutes | 360 minutes | 360 minutes | 180 minutes |
| | Ultrasonic dispersion time | 60 minutes | 60 minutes | 60 minutes | 60 minutes | 60 minutes | 60 minutes |
| | Filter hole diameter | 0.3 μm | 0.3 μm | 0.3 μm | 0.3 μm | 0.3 μm | 0.3 μm |
| | Number of times of filter process | 2 times | 2 times | 2 times | 3 times | 3 times | 2 times |
| Content of binding agent A in magnetic liquid | | 10.0 parts | 20.0 parts | 10.0 parts | 10.0 parts | 10.0 parts | 10.0 parts |
| Content of binding agent B in magnetic liquid | | 0 part | 0 part | 10.0 parts | 0 part | 0 part | 0 part |
| Alternating magnetic field application during coating | | Performed | Performed | Performed | Performed | Performed | Performed |
| Burnishing process | | Performed | Performed | Performed | Performed | Performed | Performed |
| Result | Isoelectric point of surface zeta potential of magnetic layer | 6.0 | 6.5 | 6.4 | 6.2 | 6.0 | 6.0 |
| | FIB abrasive diameter (μm) | 0.08 | 0.08 | 0.08 | 0.04 | 0.04 | 0.08 |
| | SNR decrease amount (dB) | −1.0 | −0.7 | −0.8 | −1.3 | −1.5 | −1.5 |

| | | Reference Example 1 | Reference Example 2 | Comparative Example 1 | Comparative Example 2 | Comparative Example 3 | Comparative Example 4 |
|---|---|---|---|---|---|---|---|
| Magnetic layer thickness | | 0.10 μm | 0.10 μm | 0.10 μm | 0.10 μm | 0.10 μm | 0.10 μm |
| Non-magnetic layer thickness | | 1.00 μm | 0.70 μm | 0.50 μm | 0.10 μm | 0.50 μm | 0.50 μm |
| Total thickness of non-magnetic layer and magnetic layer | | 1.10 μm | 0.80 μm | 0.60 μm | 0.20 μm | 0.60 μm | 0.60 μm |
| Preparation of magnetic layer | Oxide abrasive product name (manufactured by Sumitomo Chemical Co., Ltd.) | Hit80 | Hit80 | Hit80 | Hit80 | Hit80 | Hit80 |

TABLE 1-continued

|  |  |  |  |  |  |  |  |
|---|---|---|---|---|---|---|---|
|  | Oxide abrasive BET specific surface area (m²/g) | 30 | 30 | 30 | 30 | 30 | 30 |
|  | Content of abrasive solution dispersing agent (2,3-dihydroxynaphthalene) | 3.0 parts | 3.0 parts | 0 part | 0 part | 0 part | 3.0 parts |
|  | Beads dispersion time | 5 minutes | 5 minutes | 60 minutes | 60 minutes | 60 minutes | 60 minutes |
|  | Centrifugal separation — Rotation rate | None | None | 3500 rpm | 3500 rpm | 3500 rpm | 3500 rpm |
|  | Centrifugal separation time | None | None | 3.8 minutes | 3.8 minutes | 3.8 minutes | 3.8 minutes |
|  | Filter hole diameter | 0.5 μm | 0.5 μm | 0.3 μm | 0.3 μm | 0.3 μm | 0.3 μm |
| Preparation of magnetic layer forming composition | Stirring time | 30 minutes | 30 minutes | 60 minutes | 60 minutes | 60 minutes | 360 minutes |
|  | Ultrasonic dispersion time | 0.5 minutes | 0.5 minutes | 60 minutes | 60 minutes | 60 minutes | 60 minutes |
|  | Filter hole diameter | 0.5 μm | 0.5 μm | 0.3 μm | 0.3 μm | 0.3 μm | 0.3 μm |
|  | Number of times of filter process | 1 time | 1 time | 2 times | 2 times | 2 times | 3 times |
| Content of binding agent A in magnetic liquid |  | 10.0 parts | 10.0 parts | 10.0 parts | 10.0 parts | 10.0 parts | 10.0 parts |
| Content of binding agent B in magnetic liquid |  | 0 part | 0 part | 0 part | 0 part | 0 part | 0 part |
| Alternating magnetic field application during coating |  | Not performed | Not performed | Not performed | Not performed | Performed | Not performed |
| Burnishing process |  | Not performed | Not performed | Not performed | Not performed | Performed | Not performed |
| Result | Isoelectric point of surface zeta potential of magnetic layer | 5.0 | 4.6 | 4.6 | 4.6 | 5.8 | 4.6 |
|  | FIB abrasive diameter (μm) | 0.16 | 0.16 | 0.11 | 0.11 | 0.11 | 0.06 |
|  | SNR decrease amount (dB) | −1.0 | −1.0 | −2.5 | −3.8 | −2.5 | −2.5 |

|  |  |  | Comparative Example 5 | Comparative Example 6 | Comparative Example 7 |
|---|---|---|---|---|---|
|  | Magnetic layer thickness |  | 0.10 μm | 0.10 μm | 0.10 μm |
|  | Non-magnetic layer thickness |  | 0.50 μm | 0.50 μm | 0.50 μm |
|  | Total thickness of non-magnetic layer and magnetic layer |  | 0.60 μm | 0.60 μm | 0.60 μm |
| Preparation of magnetic layer | Oxide abrasive product name (manufactured by Sumitomo Chemical Co., Ltd.) |  | Hit100 | Hit80 | Hit80 |
|  | Oxide abrasive BET specific surface area (m²/g) |  | 40 | 30 | 30 |
|  | Content of abrasive solution dispersing agent (2,3-dihydroxynaphthalene) |  | 3.0 parts | 3.0 parts | 3.0 parts |
|  | Beads dispersion time |  | 180 minutes | 60 minutes | 60 minutes |
|  | Centrifugal separation | Rotation rate | 3500 rpm | 3500 rpm | 3500 rpm |
|  |  | Centrifugal separation time | 3.8 minutes | 3.8 minutes | 3.8 minutes |
|  | Filter hole diameter |  | 0.3 μm | 0.3 μm | 0.3 μm |
| Preparation of magnetic layer forming composition | Stirring time |  | 360 minutes | 360 minutes | 360 minutes |
|  | Ultrasonic dispersion time |  | 60 minutes | 60 minutes | 60 minutes |
|  | Filter hole diameter |  | 0.3 μm | 0.3 μm | 0.3 μm |
|  | Number of times of filter process |  | 3 times | 3 times | 3 times |
| Content of binding agent A in magnetic liquid |  |  | 10.0 parts | 10.0 parts | 10.0 parts |
| Content of binding agent B in magnetic liquid |  |  | 0 part | 0 part | 0 part |
| Alternating magnetic field application during coating |  |  | Performed | Not performed | Performed |
| Burnishing process |  |  | Performed | Performed | Not performed |
| Result | Isoelectric point of surface zeta potential of magnetic layer |  | 6.1 | 4.6 | 4.3 |
|  | FIB abrasive diameter (μm) |  | 0.03 | 0.06 | 0.06 |
|  | SNR decrease amount (dB) |  | −3.5 | −2.5 | −2.3 |

By comparing the reference examples and the comparative examples, in a case where the total thickness of the non-magnetic layer and the magnetic layer is equal to or smaller than 0.60 μm (Examples 1 to 7), it was confirmed that a deterioration in electromagnetic conversion characteristics during the repeated reproducing in a low temperature and high humidity environment was significant, compared to a case where the total thickness of the non-magnetic layer and the magnetic layer is greater than 0.60 μm (Reference Examples 1 and 2).

On the other hand, from the results shown in Table 1, according to the magnetic tapes of Examples 1 to 6, it can be confirmed that it is possible to prevent a deterioration in electromagnetic conversion characteristics during the repeated reproducing in a low temperature and high humidity environment, compared to the magnetic tapes in Comparative Examples 1 to 7, although the total thickness of the non-magnetic layer and the magnetic layer is equal to or smaller than 0.60 μm.

One aspect of the invention is effective in a technical field of various magnetic recording media such as magnetic tapes for data storage.

What is claimed is:

1. A magnetic tape comprising:
   a non-magnetic support;
   a non-magnetic layer including a non-magnetic powder and a binding agent on the non-magnetic support; and a magnetic layer including a ferromagnetic powder and a binding agent on the non-magnetic layer,
wherein a total thickness of the non-magnetic layer and the magnetic layer is equal to or smaller than 0.60 µm,
an isoelectric point of a surface zeta potential of the magnetic layer is equal to or greater than 5.5,
the magnetic layer includes an oxide abrasive, and
an average particle diameter of the oxide abrasive obtained from a secondary ion image obtained by irradiating the surface of the magnetic layer with a focused ion beam is 0.04 µm to 0.08 µm.

2. The magnetic tape according to claim 1, wherein the isoelectric point is 5.5 to 7.0.

3. The magnetic tape according to claim 1, wherein the magnetic layer includes a binding agent having an acidic group.

4. The magnetic tape according to claim 3, wherein the acidic group is at least one kind of acidic group selected from the group consisting of a sulfonic acid group and a salt thereof.

5. The magnetic tape according to claim 1, wherein the oxide abrasive is an alumina powder.

6. The magnetic tape according to claim 2, wherein the oxide abrasive is an alumina powder.

7. The magnetic tape according to claim 3, wherein the oxide abrasive is an alumina powder.

8. The magnetic tape according to claim 4, wherein the oxide abrasive is an alumina powder.

9. The magnetic tape according to claim 1, wherein the total thickness of the non-magnetic layer and the magnetic layer is 0.15 µm to 0.60 µm.

10. The magnetic tape according to claim 1, further comprising:
a back coating layer including a non-magnetic powder and a binding agent on a surface of the non-magnetic support opposite to a surface provided with the magnetic layer.

11. A magnetic tape cartridge comprising:
the magnetic tape according to claim 1.

12. The magnetic tape cartridge according to claim 11, wherein the isoelectric point is 5.5 to 7.0.

13. The magnetic tape cartridge according to claim 11, wherein the magnetic layer includes a binding agent having an acidic group.

14. The magnetic tape cartridge according to claim 13, wherein the acidic group is at least one kind of acidic group selected from the group consisting of a sulfonic acid group and a salt thereof.

15. The magnetic tape cartridge according to claim 11, wherein the oxide abrasive is an alumina powder.

16. A magnetic tape apparatus comprising:
the magnetic tape according to claim 1; and
a magnetic head.

17. The magnetic tape apparatus according to claim 16, wherein the isoelectric point is 5.5 to 7.0.

18. The magnetic tape apparatus according to claim 16, wherein the magnetic layer includes a binding agent having an acidic group.

19. The magnetic tape apparatus according to claim 18, wherein the acidic group is at least one kind of acidic group selected from the group consisting of a sulfonic acid group and a salt thereof.

20. The magnetic tape apparatus according to claim 16, wherein the oxide abrasive is an alumina powder.

* * * * *